(12) United States Patent
Wedi et al.

(10) Patent No.: US 10,194,174 B2
(45) Date of Patent: Jan. 29, 2019

(54) SIMPLIFICATIONS FOR BOUNDARY STRENGTH DERIVATION IN DEBLOCKING

(71) Applicant: Sun Patent Trust, New York, NY (US)

(72) Inventors: Thomas Wedi, The Hague (NL); Anand Kotra, Frankfurt (DE); Matthias Narroschke, Schaafheim (DE); Semih Esenlik, Nazilli (TR)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 15/918,153

(22) Filed: Mar. 12, 2018

(65) Prior Publication Data

US 2018/0205969 A1     Jul. 19, 2018

Related U.S. Application Data

(63) Continuation of application No. 15/409,771, filed on Jan. 19, 2017, now Pat. No. 10,021,428, which is a
(Continued)

(51) Int. Cl.
*H04N 7/32* (2006.01)
*H04N 19/86* (2014.01)
(Continued)

(52) U.S. Cl.
CPC .......... *H04N 19/86* (2014.11); *H04N 19/105* (2014.11); *H04N 19/117* (2014.11); *H04N 19/124* (2014.11); *H04N 19/139* (2014.11); *H04N 19/14* (2014.11); *H04N 19/159* (2014.11); *H04N 19/176* (2014.11);
(Continued)

(58) Field of Classification Search
CPC .......... H04N 7/26058; H04N 7/26244; H04N 7/26888; H04N 7/50; H04N 7/26127; H04N 7/26212; H04N 7/26377; H04N 7/26255; H04N 7/26117; H04N 7/26138; H04N 7/26207; H04N 7/26297; H04N 7/26351; H04N 7/26861; H04N 7/34; H04N 7/362;
(Continued)

(56) References Cited

U.S. PATENT DOCUMENTS

| 7,430,336 B2 | 9/2008 | Raveendran |
| 2004/0076237 A1 | 4/2004 | Kadono et al. |

(Continued)

FOREIGN PATENT DOCUMENTS

WO     2005/117447     12/2005

OTHER PUBLICATIONS

International Search Report dated Dec. 10, 2012 in International (PCT) Application No. PCT/EP2012/071584.
(Continued)

*Primary Examiner* — Obafemi O Sosanya
(74) *Attorney, Agent, or Firm* — Wenderoth, Lind & Ponack, L.L.P.

(57) ABSTRACT

The present invention relates to an advantageous scheme for boundary strength derivation and decision processing related to deblocking filtering. More particularly, the present invention improves schemes for deciding deblocking and selecting appropriate deblocking filters known in the art so as to reduce the number of calculation cycles and required memory space.

3 Claims, 40 Drawing Sheets

Related U.S. Application Data continuation of application No. 14/017,393, filed on Sep. 4, 2013, now Pat. No. 9,591,306, which is a continuation of application No. PCT/EP2012/071584, filed on Oct. 31, 2012.

(60) Provisional application No. 61/555,805, filed on Nov. 4, 2011.

(51) Int. Cl.

| | | |
|---|---|---|
| *H04N 19/50* | (2014.01) | |
| *H04N 19/139* | (2014.01) | |
| *H04N 19/159* | (2014.01) | |
| *H04N 19/176* | (2014.01) | |
| *H04N 19/117* | (2014.01) | |
| *H04N 19/14* | (2014.01) | |
| *H04N 19/105* | (2014.01) | |
| *H04N 19/124* | (2014.01) | |
| *H04N 19/172* | (2014.01) | |
| *H04N 19/182* | (2014.01) | |
| *H04N 19/184* | (2014.01) | |

(52) U.S. Cl.
CPC ........... *H04N 19/50* (2014.11); *H04N 19/172* (2014.11); *H04N 19/182* (2014.11); *H04N 19/184* (2014.11)

(58) Field of Classification Search
CPC ........ H04N 7/468; H04N 7/68; H04N 19/139; H04N 19/159; H04N 19/176
See application file for complete search history.

(56) References Cited

U.S. PATENT DOCUMENTS

| | | | |
|---|---|---|---|
| 2004/0101059 A1 | 5/2004 | Joch et al. | |
| 2005/0276505 A1* | 12/2005 | Raveendran | H04N 19/176 382/268 |
| 2008/0025632 A1* | 1/2008 | Bjontegaard | H04N 19/139 382/260 |
| 2009/0097575 A1 | 4/2009 | Teng et al. | |
| 2010/0142835 A1* | 6/2010 | Nakagami | H04N 19/159 382/233 |

OTHER PUBLICATIONS

Written Opinion of the International Searching Authority dated Dec. 10, 2012 in International (PCT) Application No. PCT/EP2012/071584.

Benjamin Bross et al., JCTVC-F803_d4, Ver. 5, "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011.

Benjamin Bross et al., JCTVC-F803_d5, Ver. 6, "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011.

Thomas Wiegand et al., JCTVC-E603 document, Section 8.6.1 "WD3: Working Draft 3 of High-Efficiency Video Coding", Joint Collaborative Team on Video Coding (JCT-VC) of ITU-T SG16 WP3 and ISO/IEC JTC1/SC29/WG11, 5th Meeting: Geneva, CH, Mar. 16-23, 2011.

Frank Bossen, JCT-VC document JCTVC-F900, "Common test conditions and software reference configurations", Joint Collaborative Team on Video Coding (JCT-VC) of ITU-T SG16 WP3 and ISO/IEC JTC1/SC29/WG11, 6th Meeting: Torino, IT, Jul. 14-22, 2011.

ITU-T Study Group 16: "Advanced video coding for generic audiovisual services, ITU-T Recommendation H.264", ITU-T Recommendation H.264, XX, XX, May 1, 2003, pp. 144-153, XP002362569, the whole document.

\* cited by examiner

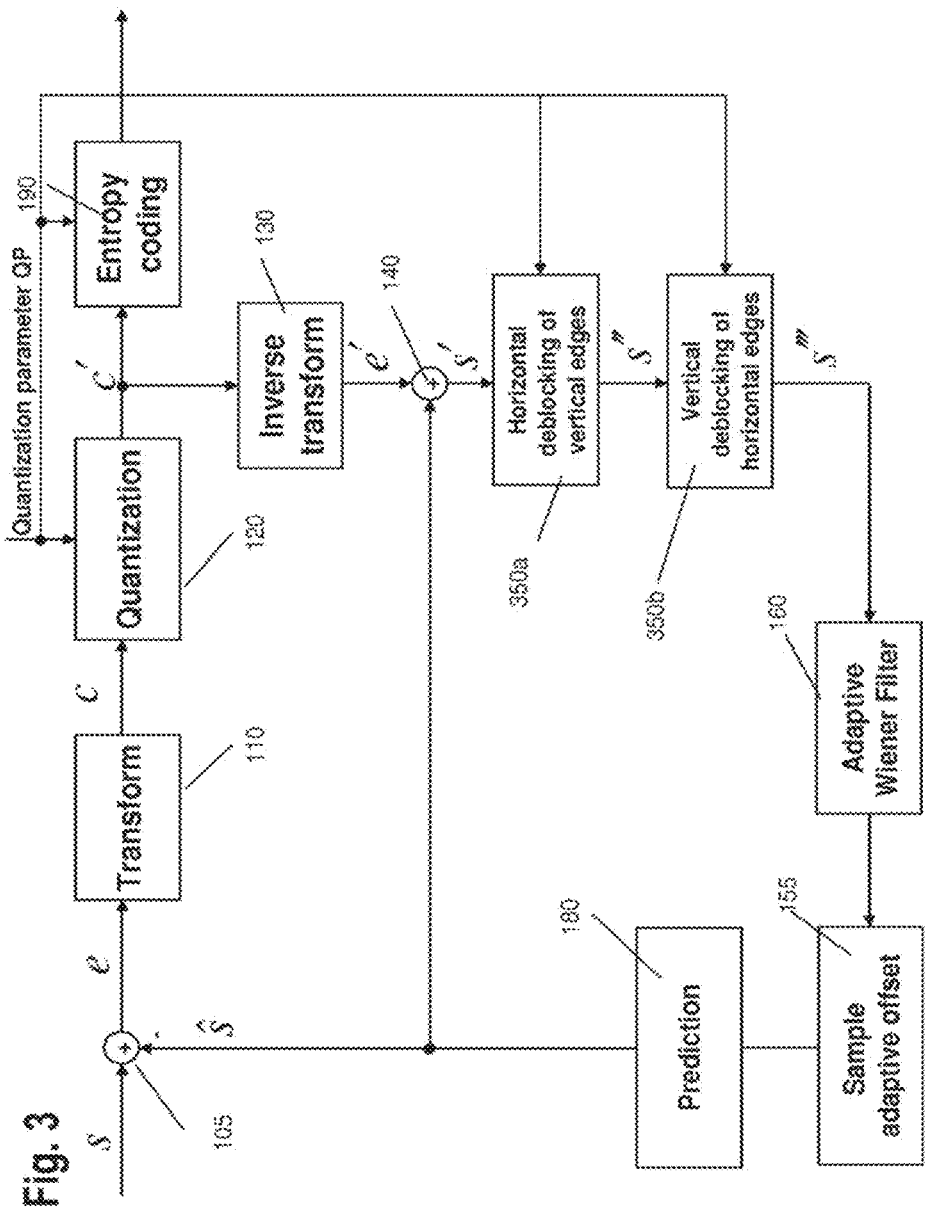

|  | All Intra HE | | | All Intra LC | | |
|---|---|---|---|---|---|---|
|  | Y | U | V | Y | U | V |
| Class A | 0.0% | 0.0% | 0.0% | 0.0% | 0.0% | 0.0% |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
|  | 0.0% | 0.0% | 0.0% | 0.0% | 0.0% | 0.0% |

|  | Random Access HE | | | Random Access LC | | |
|---|---|---|---|---|---|---|
|  | Y | U | V | Y | U | V |
| Class A | 0.0% | -0.2% | -0.1% | 0.0% | 0.1% | -0.1% |
| Class B | 0.0% | 0.1% | 0.2% | 0.0% | -0.2% | 0.1% |
| Class C | 0.0% | 0.0% | -0.1% | 0.0% | -0.2% | -0.2% |
| Class D | -0.1% | 0.3% | -0.1% | 0.0% | 0.0% | 0.2% |
| Class E |  |  |  |  |  |  |
| Overall | 0.0% | 0.1% | 0.0% | 0.0% | -0.1% | 0.0% |
|  | 0.0% | 0.1% | 0.0% | 0.0% | -0.1% | 0.0% |

|  | Low delay B HE | | | Low delay B LC | | |
|---|---|---|---|---|---|---|
|  | Y | U | V | Y | U | V |
| Class A |  |  |  |  |  |  |
| Class B | 0.0% | 0.1% | 0.2% | 0.0% | 0.1% | 0.0% |
| Class C | 0.0% | -0.2% | -0.2% | 0.0% | 0.1% | 0.0% |
| Class D | 0.0% | 0.1% | -0.2% | -0.1% | 0.4% | -0.1% |
| Class E | -0.1% | 0.1% | -0.1% | 0.0% | -0.1% | 0.0% |
| Overall | 0.0% | 0.0% | 0.0% | 0.0% | 0.0% | 0.0% |

|  | Low delay P HE | | | Low delay P LC | | |
|---|---|---|---|---|---|---|
|  | Y | U | V | Y | U | V |
| Class A |  |  |  |  |  |  |
| Class B | -0.1% | -0.1% | 0.0% | -0.1% | 0.1% | 0.0% |
| Class C | 0.0% | -0.2% | 0.0% | 0.0% | 0.0% | -0.1% |
| Class D | 0.0% | 0.0% | 0.2% | 0.0% | -0.4% | 0.0% |
| Class E | -0.3% | -0.6% | -0.5% | -0.2% | 0.0% | 0.2% |
| Overall | -0.1% | -0.2% | 0.0% | -0.1% | -0.1% | 0.0% |

Reference: HM-4.0 Reference
Tested: HM-4.0 Modify_Boundary_Strength

Common test conditions

FIG. 10B

|  | Random Access HE | | | Random Access LC | | |
|---|---|---|---|---|---|---|
|  | Y | U | V | Y | U | V |
| Class A | 0,0% | 0,4% | 0,1% | 0,0% | 0,0% | 0,1% |
| Class B | 0,0% | -0,3% | 0,5% | 0,0% | 0,0% | -0,2% |
| Class C | 0,1% | -0,2% | -0,3% | -0,1% | -0,3% | 0,3% |
| Class D | 0,0% | 0,2% | -0,1% | -0,2% | 1,3% | 0,5% |
| Class E |  |  |  |  |  |  |
| Overall | 0,0% | 0,0% | 0,1% | -0,1% | 0,2% | 0,2% |
|  | 0,0% | 4,6% | 36,1% | -0,1% | -4,0% | 0,8% |

|  | Low delay B HE | | | Low delay B LC | | |
|---|---|---|---|---|---|---|
|  | Y | U | V | Y | U | V |
| Class A |  |  |  |  |  |  |
| Class B | 0,0% | 0,0% | -0,6% | -0,2% | 0,1% | -0,1% |
| Class C | 0,0% | 0,0% | 0,4% | 0,1% | 0,4% | -0,5% |
| Class D | -0,1% | 0,6% | -0,8% | -0,1% | 1,1% | 1,4% |
| Class E | -0,1% | 0,9% | 0,3% | 0,0% | 0,5% | -0,3% |
| Overall | 0,0% | 0,3% | -0,3% | -0,1% | 0,5% | 0,1% |
|  | 0,0% | 2,4% | -1,3% | -0,1% | 0,9% | 0,2% |

|  | Low delay P HE | | | Low delay P LC | | |
|---|---|---|---|---|---|---|
|  | Y | U | V | Y | U | V |
| Class A |  |  |  |  |  |  |
| Class B | 0,0% | 0,2% | -0,2% | -0,1% | 0,8% | -0,1% |
| Class C | 0,2% | -0,4% | -0,5% | -0,1% | -0,2% | 0,3% |
| Class D | 0,0% | -1,0% | 0,1% | -0,1% | 0,9% | 0,2% |
| Class E | 0,1% | 0,3% | 0,3% | 0,0% | 0,7% | 0,5% |
| Overall | 0,1% | -0,2% | -0,1% | -0,1% | 0,5% | 0,2% |
|  | 0,1% | 0,2% | 0,2% | -0,1% | 0,9% | 0,4% |

| Reference: | HM-4.0_Reference |
| Tested: | HM-4.0_Modify_Boundary_Strength_Higher QP's [39,41,43,45] |

High QP's QP: [39,41,43,45]

FIG. 12

| | All Intra HE | | | All Intra LC | | |
|---|---|---|---|---|---|---|
| | Y | U | V | Y | U | V |
| Class A | 0.0% | 0.0% | 0.0% | 0.0% | 0.0% | 0.0% |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
| | 0.0% | 0.0% | 0.0% | 0.0% | 0.0% | 0.0% |

| | Random Access HE | | | Random Access LC | | |
|---|---|---|---|---|---|---|
| | Y | U | V | Y | U | V |
| Class A | 0.0% | 0.0% | 0.0% | 0.0% | 0.0% | 0.0% |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | | | | | | |
| Overall | 0.0% | 0.0% | 0.0% | 0.0% | 0.0% | 0.0% |
| | 0.0% | 0.0% | 0.0% | 0.0% | 0.0% | 0.0% |

| | Low delay B HE | | | Low delay B LC | | |
|---|---|---|---|---|---|---|
| | Y | U | V | Y | U | V |
| Class A | | | | | | |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
| | 0.0% | 0.0% | 0.0% | 0.0% | 0.0% | 0.0% |

| | Low delay P HE | | | Low delay P LC | | |
|---|---|---|---|---|---|---|
| | Y | U | V | Y | U | V |
| Class A | | | | | | |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
| | 0.0% | 0.0% | 0.0% | 0.0% | 0.0% | 0.0% |

Reference: HM 4.0
Tested: HM-4.0_BS_simplify
49 frames
Note: BD-rate is computed using piece-wise cubic interpolation
Shaded numbers using cubic interpolation

Fig. 34

| Corresponding standard | Driving frequency |
|---|---|
| MPEG-4 AVC | 500 MHz |
| MPEG-2 | 350 MHz |
| ... | ... |

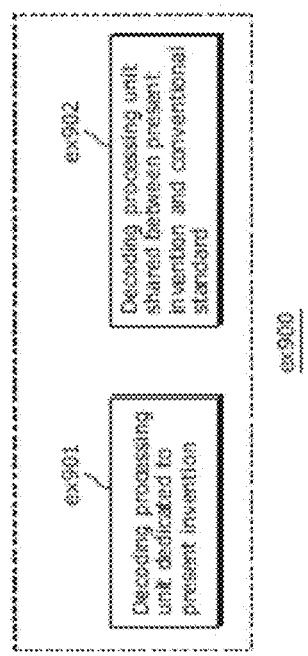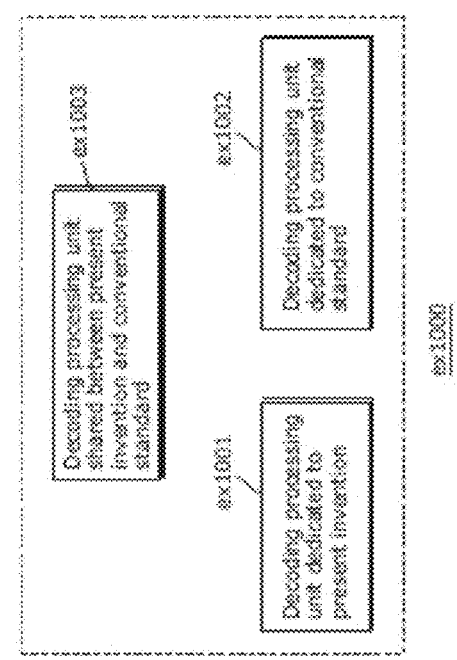
Fig. 35A
Fig. 35B

SIMPLIFICATIONS FOR BOUNDARY STRENGTH DERIVATION IN DEBLOCKING

BACKGROUND OF THE INVENTION

1. Field of the Invention

The present invention relates to the filtering of images. In particular, the present invention relates to deblocking filtering and to the derivation of decision criteria for deblocking filtering.

2. Description of the Related Art

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

FIG. 1 is an example of a typical H.264/MPEG-4 AVC and/or HEVC video encoder 100. A subtractor 105 first determines differences e between a current block to be encoded of an input video image (input signal s) and a corresponding prediction block ŝ, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signal ŝ. In order to maintain the compatibility between the encoder side and the decoder side, the prediction signal ŝ is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. For instance, the deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal ŝ and by the quantized prediction error signal e'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, a sample adaptive offset 155 and/or adaptive loop filter 160 may be applied to the image including the already deblocked signal s". Whereas the deblocking filter improves the subjective quality, sample adaptive offset (SAO) and ALF aim at improving the pixel-wise fidelity ("objective" quality). In particular, SAO adds an offset in accordance with the immediate neighborhood of a pixel. The adaptive loop filter (ALF) is used to compensate image distortion caused by the compression. Typically, the adaptive loop filter is a Wiener filter with filter coefficients determined such that the mean square error (MSE) between the reconstructed s' and source images s is minimized. The coefficients of ALF may be calculated and transmitted on a frame basis. ALF can be applied to the entire frame (image of the video sequence) or to local areas (blocks). An additional side information indicating which areas are to be filtered may be transmitted (block-based, frame-based or quadtree-based).

In order to be decoded, inter-encoded blocks require also storing the previously encoded and subsequently decoded portions of image(s) in the reference frame buffer 170. An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (in FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

The H.264/MPEG-4 H.264/MPEG-4 AVC as well as HEVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

FIG. 2 illustrates an example decoder 200 according to the H.264/MPEG-4 AVC or HEVC video coding standard. The encoded video signal (input signal to the decoder) first passes to entropy decoder 290, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing 255, and an adaptive loop filter 260 and the resulting decoded signal is stored in the memory 270 to be applied for temporal or spatial prediction of the following blocks/images.

A further illustration of an exemplary hybrid video encoder is shown in FIG. 3. The encoder of FIG. 3 differs from the encoder of FIG. 1 in that deblocking filter 150 of FIG. 1 has been subdivided in a filter 350a for horizontal deblocking of vertical edges and a filter 350b for vertical deblocking of horizontal edges. Filter 350a is applied to the reconstructed signal S' being the output of adder 140. The output of filter 350b, i.e. an image with deblocked vertical edges as denoted S" and input into filter 350b. The output signal of filter 350b, i.e. a vertically and horizontally deblocked image, and has been denoted S'". Moreover, FIG. 3 explicitly shows the quantization parameter QP to be input into entropy encoder 190, horizontal deblocking filter 350a and vertical deblocking filter 350b.

The remaining blocks of FIG. 3 correspond to respective blocks of FIG. 1, and like features have been denoted by the same reference numerals in FIG. 3 and FIG. 1. In FIG. 3, the adapted loop filter 160 has been explicitly described as a Wiener filter, and the blocks 155 (SAO) and 160 (ALF) have been interchanged. The sequence of these steps is, however, not essential for the present invention. Moreover, reference frame buffer 170 has not been explicitly shown in FIG. 3.

In view of the close analogy of the respective features of the encoder of FIG. 1 and the decoder of FIG. 2, a person skilled in the art is aware of how to modify FIG. 2 in order to illustrate a decoder wherein horizontal and vertical deblocking in two subsequent steps is made explicit. A respective figure has therefore been omitted herein.

When compressing and decompressing an image, the blocking artifacts are typically the most annoying artifacts for the user. The deblocking filtering helps to improve the perceptual experience of the user by smoothing the edges between the blocks in the reconstructed image. One of the difficulties in deblocking filtering is to correctly decide between an edge caused by blocking due to the application of a quantizer and between edges which are part of the coded signal. Application of the deblocking filter is only desirable if the edge on the block boundary is due to compression artifacts. In other cases, by applying the deblocking filter, the reconstructed signal may be despaired, distorted. Another difficulty is the selection of an appropriate filter for deblocking filtering. Typically, the decision is made between several low pass filters with different frequency responses resulting in strong or weak low pass filtering. In order to decide whether deblocking filtering is to be applied and to select an appropriate filter, image data in the proximity of the boundary of two blocks are considered.

For instance, quantization parameters of the neighboring blocks may be considered. Alternatively or in addition, prediction modes such as intra or inter may be considered. Another possibility is to evaluated quantized prediction error coefficients, for instance, how many of them are quantized to zero. Reference frames used for the motion compensated prediction may also be indicative for selection of the filter, for instance, whether the same reference frames are used for prediction of the current block and the neighboring blocks. The decision may also be based on motion vectors used for the motion compensated prediction and on whether the motion vectors for the current block and for the neighboring blocks are the same or better they defer. The decision may involve spatial positions of the samples such as distance to the block patch.

For instance, H.264/MPEG-4 AVC evaluates the absolute values of the first derivation (derivative) in each of the two neighboring blocks, the boundary of which is to be deblocked. In addition, absolute values of the first derivative across the edge between the two blocks are evaluated, as described, for instance in H.264/MPEG-4 AVC standard, Section 8.7.2.2. A similar approach is also described in US 2008/0025632 A. The decision is taken for all pixels to be filtered based on the same criterion and the selection is performed for the entire block. HEVC employs a similar mechanism, however, uses also a second derivative.

According to these approaches, for a particular edge (boundary) between two blocks, it has to be decided whether to apply deblocking at all, and if so, which filter out of a plurality of different deblocking filters having different filter strengths is to be applied. Generally speaking, a deblocking filter having a higher filter strength ("strong filter") performs more substantial amendments to the pixel values adjacent to the boundary than a filter having less filter strength ("weak filter"). The aim of the decision whether to filter or not is to filter only those samples, for which the large signal change detected at the block boundary results from the quantization applied in the block-wise processing. The result of this filtering is a smooth signal at the block boundary. The smooth signal is less annoying to the viewer than the blocking artefact. Those samples for which the large signal change at the block boundary belongs to the original signal to be coded, should not be filtered in order to keep high frequencies, and thus the visual sharpness. In the case of wrong decisions, the image is either unnecessarily smoothened or remains blocky.

A plurality of decision criteria have been derived in the art in order to perform the decisions described above. The decision criteria operate on the basis of parameters specifying particulars of the pixel value distribution on both sides of the block boundary. Generally speaking, at first a parameter (boundary strength, BS) is derived to indicate how pronounced block artefacts at a block boundary appear. Based thereon, parameters for defining decision thresholds are derived. Each step in said decision flow, and in particular, in the derivation of the boundary strength (BS) consumes some (1 or several) CPU cycles. Moreover, each of the parameters involved in the decision flow requires a respective memory space. For reasons of processing efficiency, it is therefore desirable to perform the necessary calculations and decisions with as few intermediate steps and parameters as possible.

SUMMARY OF THE INVENTION

The present invention aims to provide an improved deblocking filtering approach, wherein the processing efficiency for deciding on deblocking and filter selection is improved by simplifying the underlying calculations.

It is the particular approach of the present invention to select the deblocking filter for deblocking a block boundary out of a plurality of deblocking filters having different filter strengths based on a threshold that is derived as a single function of a sum of two parameters. One parameter (boundary strength) indicates the strength of blocking artefacts at the boundary, i.e. how blocky the edge (boundary) appears. The other parameter (quantization) indicates a size of the quantization intervals applied in encoding.

According to an aspect of the present invention, a method is provided for deblocking filtering of image blocks of pixels. The method comprises the steps of determining a first parameter indicating a strength of a block boundary between two adjacent image blocks, and calculating a second parameter, based on the first parameter and a quantization parameter, wherein the second parameter is calculated as a function of the sum of the first parameter and the quantization parameter. The method further comprises the step of selecting a first or a second deblocking filter for being applied to the block boundary using a threshold that is defined based on the second parameter, wherein the first and the second deblocking filters have different filter strengths.

According to another aspect of the present invention, a device is provided for deblocking filtering of image blocks of pixels. The device comprises a determining unit for determining a first parameter indicating a strength of a block boundary between two adjacent image blocks. The device further comprises a calculation unit for calculating a second parameter, based on the first parameter and the quantization parameter. The calculation unit calculates the second parameter as a function of the sum of the first parameter and the quantization parameter. The device further comprises a selection unit for selecting a first or a second deblocking filter for being applied to the block boundary using a threshold that is defined based on the second parameter. The first and the second deblocking filters have different filter strengths.

BRIEF DESCRIPTION OF THE DRAWINGS

The accompanying drawings are incorporated into and form a part of a specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein:

FIG. 3 is another block diagram illustrating an example of a video encoder;

FIG. 6A is a schematic drawing illustrating deblocking operations performed by a strong filter;

FIG. 6B is a schematic drawing illustrating deblocking operations performed by a weak filter;

FIG. 10A illustrates a comparison of coding efficiency between the improved scheme of FIG. 9B and the conventional scheme of FIG. 8;

FIG. 10B illustrates a comparison of coding efficiency between the improved scheme of FIG. 9B and the conventional scheme of FIG. 8, under the common test conditions;

FIG. 12 illustrates a comparison of coding efficiency between the simplified scheme of FIG. 11 and the conventional scheme of FIG. 8;

FIG. 34 shows an example of a look-up table in which video data standards are associated with driving frequencies.

FIG. 35A is a diagram showing an example of a configuration for sharing a module of a signal processing unit.

FIG. 35B is a diagram showing another example of a configuration for sharing a module of the signal processing unit.

DETAILED DESCRIPTION OF THE INVENTION

State of the art hybrid video coders such as those illustrated in FIG. 3, apply block-wise prediction and block-wise prediction error coding. The prediction error coding includes a quantization step. Due to this block-wise processing, so-called blocking artifacts occur, especially in the case of coarse quantization. A blocking artifact is associated with a large signal change at a block edge. These blocking artifacts are very annoying for the viewer. In order to reduce these blocking artifacts, deblocking filters are applied, for instance in the H.264/MPEG-4 AVC video coding standard or in the HM, which is the test model of the HEVC video coding standardization activity (cf., for instance, HM deblocking filter, JCTVC-F803_d4, "WD4: Working Draft 4 of High-Efficiency Video Coding", 6th meeting Torino, IT, Jul. 14-22, 2011).

Deblocking filters decide for each sample at a block boundary if it is filtered or not and apply a low pass filter in the case that it is decided to filter. The aim of this decision is to filter only those samples for which the large signal change at the block boundary results from the quantization applied in the block-wise processing. The result of this processing is a smooth signal at the block boundary. The smooth signal is less annoying to the viewer than the blocking artifact. Those samples for which the large signal change at the block boundary belongs to the original signal to be coded should not be filtered in order to keep high frequencies and thus the visual sharpness. In the case of wrong decisions, the image is either unnecessarily smoothened or remains blocky.

Figure 1:
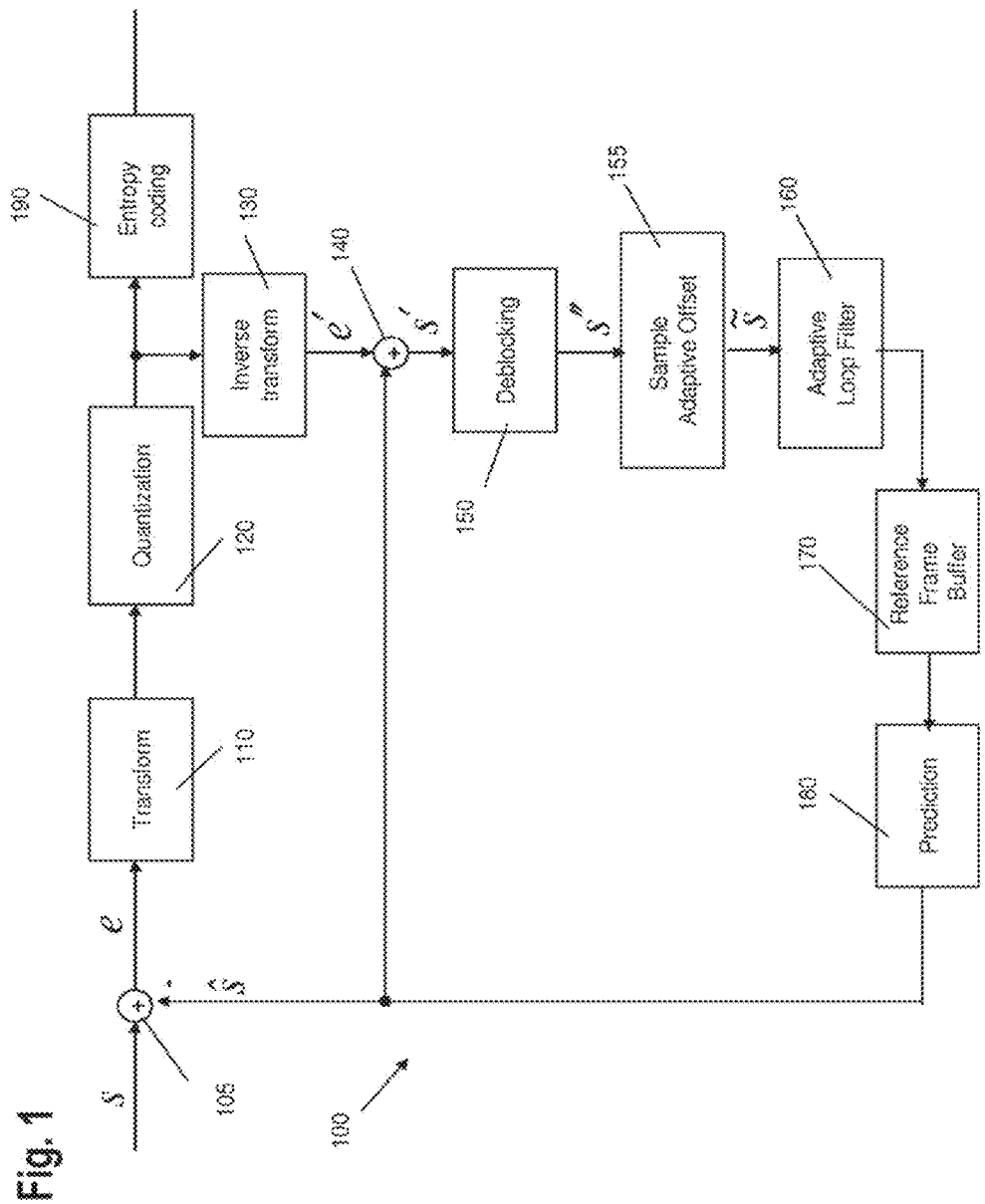
FIG. 1 is a block diagram illustrating an example of a video encoder.
Figure 2:
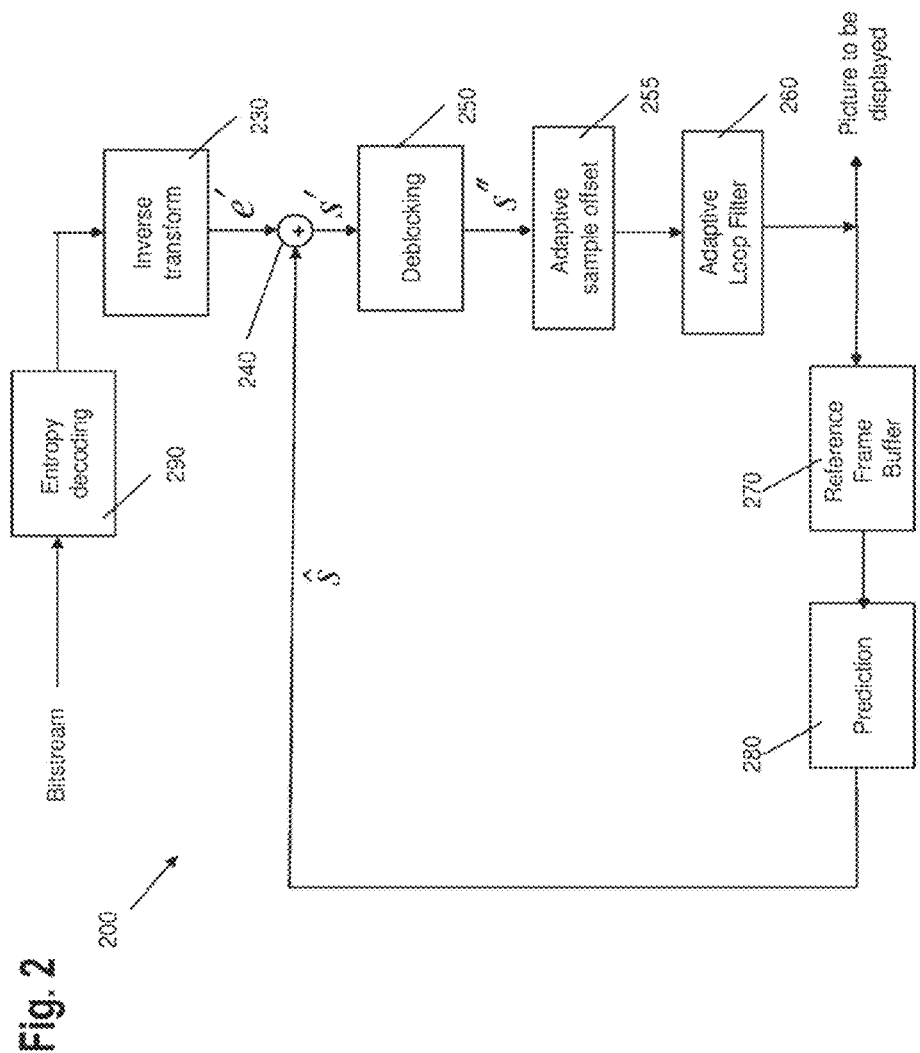
FIG. 2 is a block diagram illustrating an example of a video decoder

FIG. 4 shows an example of an application of a deblocking filter (such as 150, 250, 350a and 350b) referred to in the description of FIGS. 1, 2 and 3, respectively. Such a deblocking filter may decide for each sample at a block boundary whether it is to be filtered or not. When it is to be filtered, a low pass filter is applied. The aim of this decision is to filter only those samples, for which the large signal change at the block boundary results from the quantization applied in the block-wise processing as described in the background art section above. The result of this filtering is a smoothed signal at the block boundary. The smoothed signal is less annoying to the viewer than the blocking artifact. Those samples, for which the large signal change at the block boundary belongs to the original signal to be coded, should not be filtered in order to keep high frequencies and thus the visual sharpness. In the case of wrong decisions, the image is either unnecessarily smoothened or remains blocky.

Figure 4B:
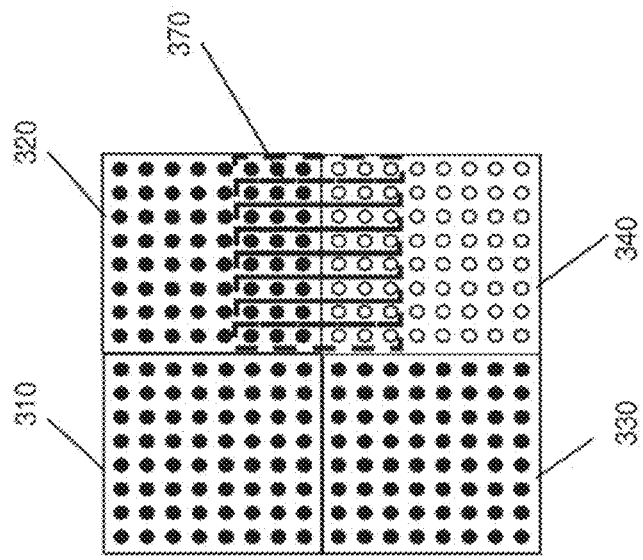
FIG. 4B is a schematic drawing illustrating the application of a deblocking filter on a horizontal boundary.
Figure 4A:
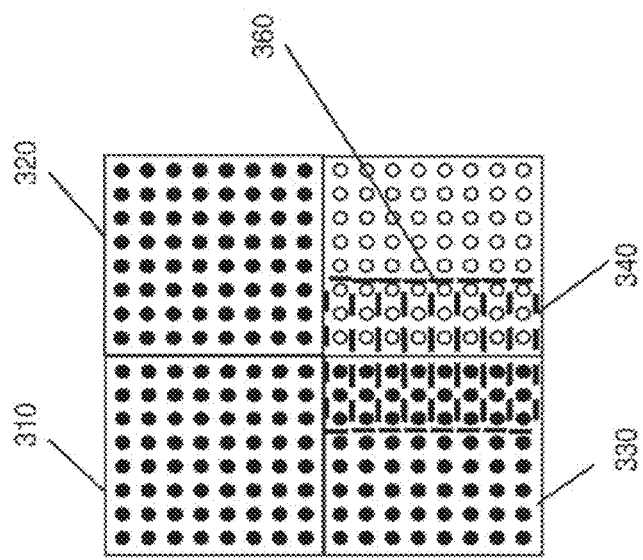
FIG. 4A is a schematic drawing illustrating the application of a deblocking filter on a vertical boundary.

FIG. 4A illustrates decision on a vertical boundary (to filter or not to filter with a horizontal deblocking filter) and FIG. 4B illustrates decision on a horizontal boundary (to filter or not with a vertical deblocking filter). In particular, FIG. 5A shows a current block 340 to be decoded and its already decoded neighbouring blocks 310, 320, and 330. For the pixels 360 in a line, the decision is performed. Similarly, FIG. 5B shows the same current block 340 and decision performed for the pixels 370 in a column.

Figure 5:
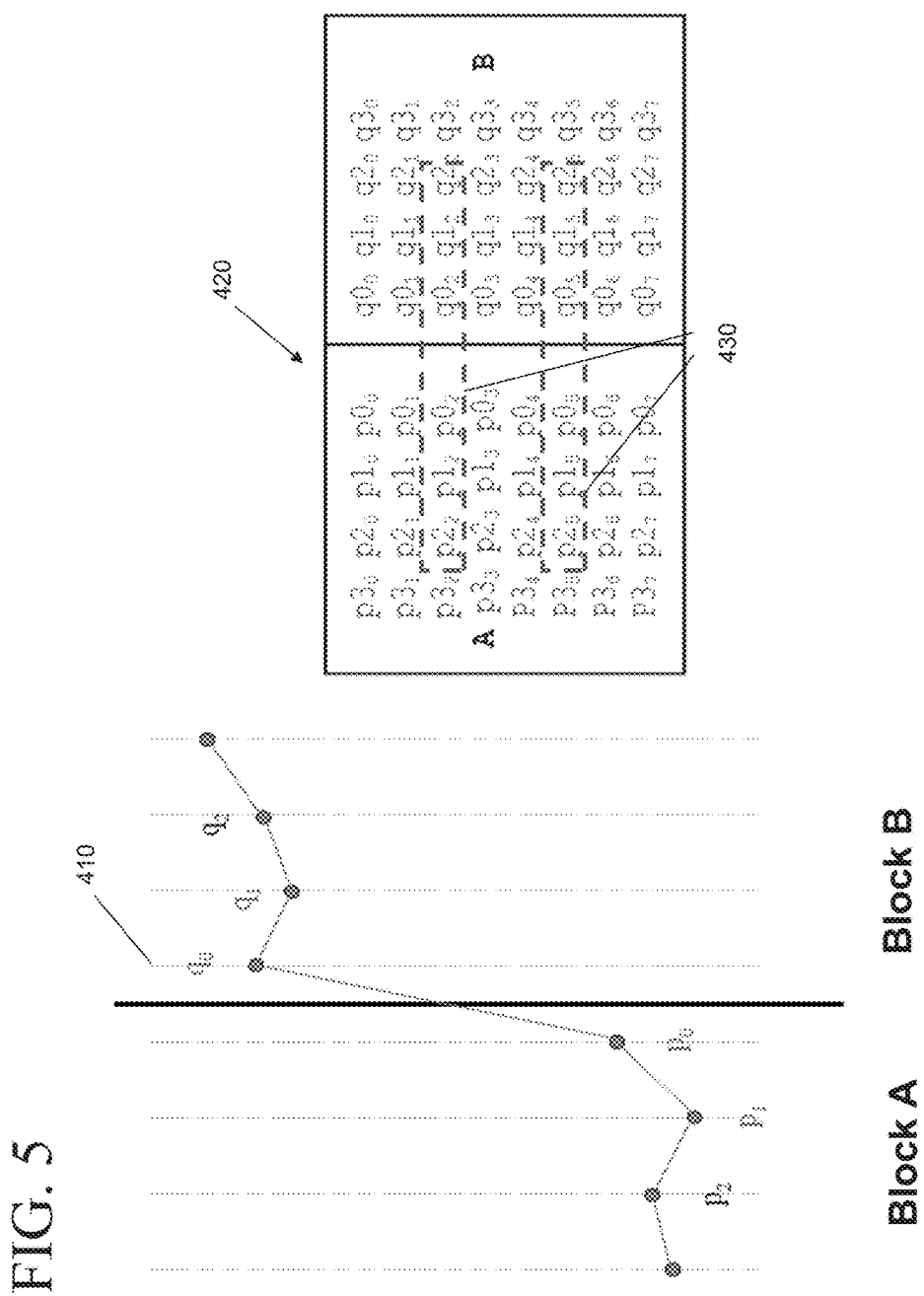
FIG. 5 is a schematic drawing illustrating a decision whether to apply or not to apply deblocking and a selection of a deblocking filter.

The judgment on whether to apply the deblocking filter may be performed as follows, similarly to H.264/MPEG-4 AVC. Let us take a line of six pixels 360, the first three pixels p2, p1, p0 of which belong to a left neighboring block A 330 and the following three pixels q0, q1, and q2 of which belong to the current block B 340 as also illustrated in FIG. 5. Line 410 illustrates a boundary between the blocks A and B. Pixels p0 and q0 are the pixels of the left neighbor A and of the current block B, respectively, located directly adjacent to each other. Pixels p0 and q0 are filtered by the deblocking filtered for instance, when the following conditions are fulfilled:

$|p_0 - q_0| < \alpha_{H264}(QP_{New})$, $|p_1 - p_0| < \beta_{H264}(QP_{New})$, and $|q_1 - q_0| < \beta_{H264}(QP_{New})$ wherein, in general, $\beta_{H264}(QP_{New}) < \alpha_{H264}(QP_{New})$. These conditions aim at detecting whether the difference between p0 and q0 stems from blocking artifacts. They correspond to evaluation of the first derivation within each of the blocks A and B and between them.

Pixel p1 is filtered if, in addition to the above three conditions, also the following condition is fulfilled:

$|p_2 - p_0| < \beta_{H264}(QP_{New})$

Pixel q1 is filtered, for instance, if in addition to the above first three conditions also the following condition is fulfilled:

$|q_2 - q_0| < \beta_{H264}(QP_{New})$.

These conditions correspond to a first derivation within the first block and a first derivation within the second block, respectively. In the above conditions, QP denotes quantization parameter indicating the amount of quantization applied, and β,α are scalar constants. In particular, $QP_{New}$ is quantization parameter derived based on quantization parameters $QP_A$ and $QP_B$ applied to the respective first and second block A and B as follows:

$QP_{New} = (QP_A + QP_B + 1) >> 1$, wherein ">>n" denoted right shift by n bits (in the above formula: one bit).

The above conditions correspond to evaluating of the first derivative within the blocks. The decision may be performed only for a selected line or selected lines of a block, while the filtering of pixels accordingly is then performed for all lines 360. An example 420 of lines 430 involved in decision in compliance with HEVC is illustrated in FIG. 5. Based on lines 430, the decision whether to filter entire block is carried out.

Another example of deblocking filtering in HEVC can be found in JCTVC-E603 document, Section 8.6.1, of JTC-VC, of ITU-T SG16 WP3 and ISO/IEC JTC1/SC29/WG11, freely available under http://wftp3.itu.int/av-arch/jctvc-site/.

Accordingly, in HEVC the two lines 430 are used to decide whether and how the deblocking filtering is to be applied. This decision step is labeled first decision step D1 throughout this specification. The example 420 assumes the evaluating of the third (with index 2) and the sixth (with index 5) line for the purpose of horizontally blocking filtering. In particular, the second derivative within each of the blocks is evaluated resulting in the obtaining of measures $d_p$ and $d_q$ as follows:

$d_{p3} = |p2_2 - 2 \cdot p1_3 + p0_2|$ $d_{q3} = |q2_2 - 2 \cdot q1_2 + q0_2|$ $d_{p5} = |p2_5 - 2 \cdot p1_5 + p0_5|$ $d_{q5} = |q2_5 - 2 \cdot q1_5 + q0_5|$ $d_p = d_{p2} + d_{p5}$ $d_q = d_{q2} + d_{q5}$ The pixels p belong to block A and pixels q belong to block B. The first number after p or q denotes column index and the following number in subscript denotes row number within the block. The deblocking for all eight lines illustrated in the example 420 is enabled when the following condition is fulfilled:

$d = d_p + d_q < \beta(QP)$.

If the above condition is not fulfilled, no deblocking is applied. In the case that deblocking is enabled, the filter to be used for deblocking is determined in a subsequent decision step labelled second decision step D2 throughout the present specification. This determination is based on the evaluation of the first derivative between the blocks A and B. In particular, for each line i, wherein i is an integer between 0 and 7, it is decided whether a strong or a weak low pass filter is to be applied. A strong filter is elected if the following condition is fulfilled.

$|p3_i - p0_i| + |q3_i - q0_i| < \beta(QP) >> 3)^\wedge$ $d < (\beta(QP) >> 2)^\wedge$ $|p0_i - q0_i| < ((t_c(QP) \cdot 5 + 1) >> 1)$.

In compliance with the HEVC model "the strong filter" filters samples $p2_i$, $p2_i$, $p0_i$, $q0_i$, $q1_i$, $q2_i$ using $p3_i$, $p2_i$, $p1_i$, $p0_i$, $q0_i$, $q1_i$, $q2_i$, $q3_i$, whereas a "weak filter" filters samples $p1_i$, $p0_i$, $q0_i$, $q1_i$ using $p2_i$, $p1_i$, $p0_i$, $q0_i$, $q1_i$, $q2_i$. In the above conditions, parameters P3 and $t_c$ are both functions of the quantization parameter $QP_e$ which may be set for a slice of the image or the like. The values of β and $t_c$ are typically derived based on QP using lookup tables.

FIG. 6 explains in more detail exemplary solutions for strong filter operations and weak filter operations in compliance with the H264/MPEG-4 AVC standard (implemented in HEVC software model HM4.0).

Figure 6A:
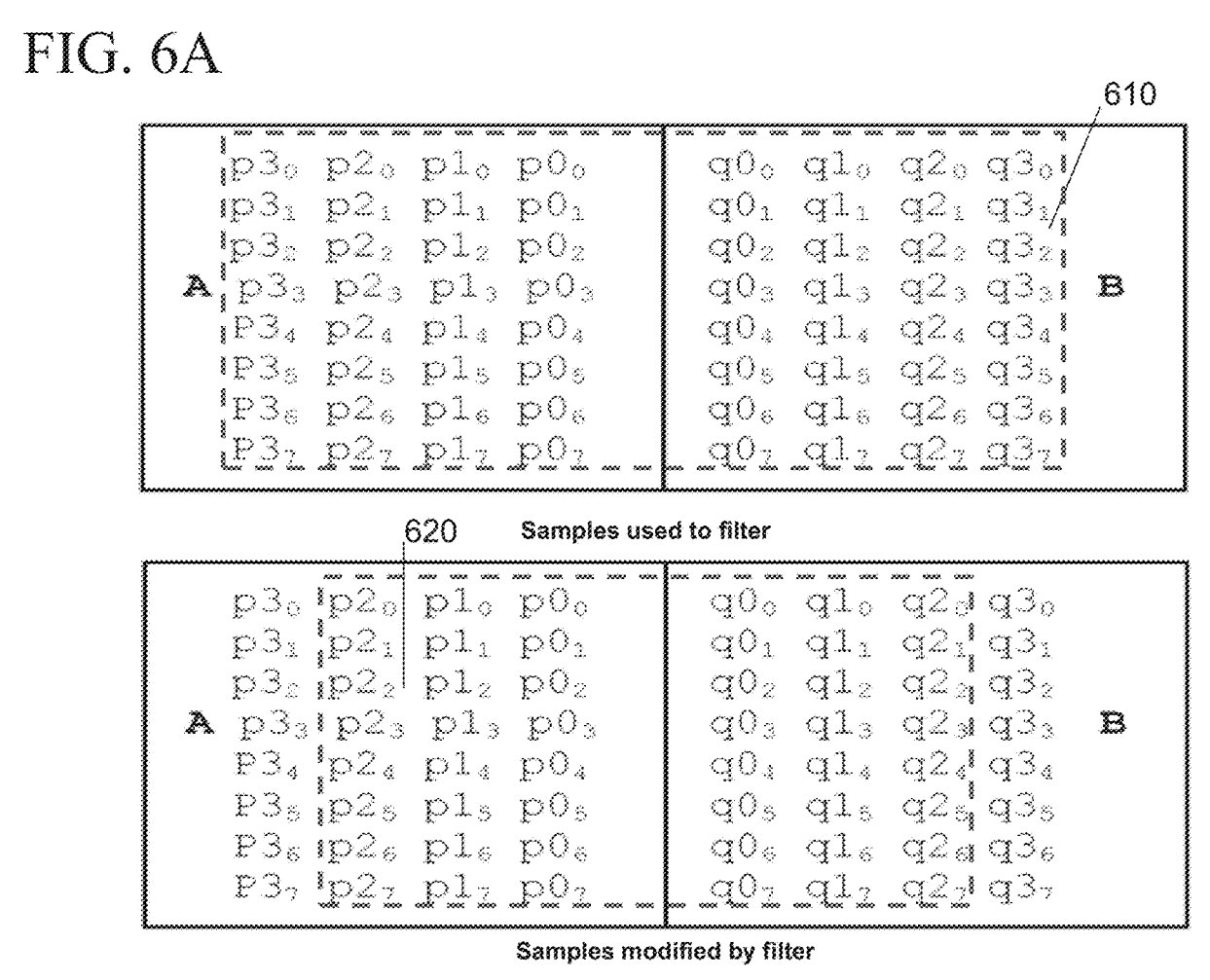

In FIG. 6A illustrates the samples used for horizontally filtering a vertical edge in a strong filter. FIG. 6A illustrates the samples that are modified by the filter. As can be seen from the drawing, in the given example samples corresponding to the 4 pixels most adjacent to both sides of the boundary, denoted by reference numeral 610, are used for the filtering. Actually modified are only those 3 pixels closest to the boundary from both sides denoted by 620 in FIG. 6A.

Actually, filtering is performed in accordance with the following formulae.

$$p0_i'=\text{Clip}((p2_i+2 \cdot p1_i+2 \cdot p0_i+2 \cdot q0_i+q2_i+4)>>3)$$

$$p1_i'=\text{Clip}((p2_i+p1_i+p0_i+q0_i+2)>>2)$$

$$p2_i'=\text{Clip}((2 \cdot p3_i+3 \cdot p2_i+p1_i+p0_i+q0_i+4)>>3)$$

$$q0_i'=\text{Clip}((q2_i+2 \cdot q1_i+2 \cdot q0_i+2 \cdot p0_i+p2_i+4)>>3)$$

$$q1_i'=\text{Clip}((q2_i+q1_i+q0_i+p0_i+2)>>2)$$

$$q2_i'=\text{Clip}((2 \cdot q3_i+3 \cdot q2_i+q1_i+q0_i+p0_i+4)>>3)$$

The function Clip(x) is defined as follows:

$$\text{Clip}(x) = \begin{cases} 0; & x<0 \\ \text{max\_allowed\_value}; & x > \text{max\_allowed\_value} \\ x; & \text{else} \end{cases}$$

Hereby, max_allowed_value is a maximum value, which x can have. In the case of PCM coding with k bit samples, the maximum value would be max_allowed_value=$2^k-1$. For instance, in the case of PCM coding with 8 bit samples, the maximum value would be max_allowed_value=255. In the case of PCM coding with 10 bit samples, the maximum value would be max_allowed_value=1023.

As can be seen from the above equations, filtering is performed individually for each line (only a single line index i=0, 1, 2, 3, 4, 5, 6, or 7) is employed in each of the formulae where pixels are modified by a filter (indicated by a prime ' after the filter number). While no modified pixels are calculated for $p3_i$ and $q3_i$, respectively, it can be seen from the equations for $p2_i'$ and $q2_i'$, respectively that $p3_i$ and $q3_i$ occur on the right hand sides of the respective calculation equations.

Figure 6B:
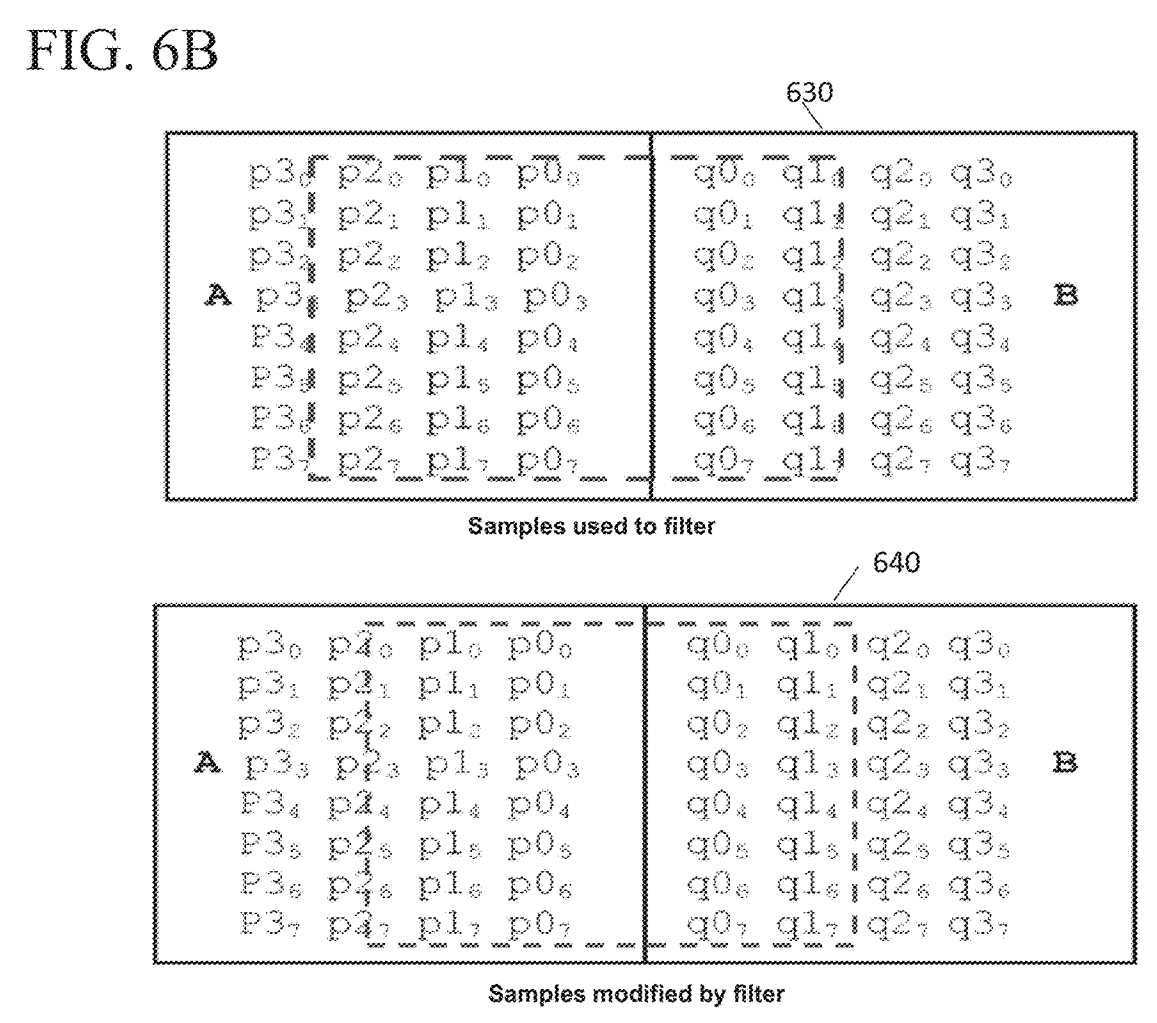

As can be seen from FIG. 6B, the three closest pixels to the boundary from both sides are used for filtering by the weak filter (samples 630 in the left hand side scheme). Actually modified are the only the two closest neighbours to the boundary (samples 640 of FIG. 6B. The calculation processing for the weak filtering substantially differs from the calculation in the case of strong filtering and includes further decisions. Firstly, a discrimination value Δ is calculated according to equation $$\Delta = (9 \cdot (q0_i-p0_i)-3 \cdot (q1_i-p1_i)+8)>>4$$

on which the decisions are based.

Subsequently in a third decision step D3 it is decided whether to perform filtering at all. In accordance with the third decision, filtering is only applied to pixel samples 640, if the condition $|\Delta|<10 \cdot t_c$ is fulfilled.

In the case that the condition is fulfilled, the closest pixels to the boundary on both sides are filtered in accordance with equations $$q0_i'=\text{Clip}(q0_i-\Delta_1), \text{ wherein}$$

$$p0_i'=\text{Clip}(p0_i+\Delta_1)$$

$$\Delta_1=\text{Clip3}(-t_c,t_c,\Delta)$$

The function Clip(x) is defined as above. The function Clip3(x) is defined as follows:

$$\text{Clip3}(x, a, b) = \begin{cases} a; & x < a \\ b; & x > b \\ x; & \text{else} \end{cases}$$

After filtering samples p0 and q0, a fourth decision D4 is performed as to whether to also filter the next closest pixel samples from the viewpoint of the boundary, $p1_i$ and $q1_i$. The fourth decision D4 is performed separately for both sides of the boundary, i.e. for the pixels $p1_i$ belong to block A of FIG. 6B and pixels $q1_i$ of block B of FIG. 6B.

The fourth decision for pixels $p1_i$ is based on the above introduced parameter $d_p$. If the condition $d_p<(\beta/6)$ is fulfilled, filtering is performed in accordance with $p1_i'=\text{Clip}(p1_i+\Delta_{2p})$, wherein $\Delta_{2p}=\text{Clip3}(-t_{c2},t_{c2},(((p2_i+p0_i+1)>>1)-p1_i+\Delta_i)>>1)$.

Decision D4 for pixels $q_i$ of block B is performed if condition $d_q<(\beta/6)$ is fulfilled. Filtering is performed in accordance with $q1_i'=\text{Clip}(q1_i+\Delta_{2q})$, wherein $$\Delta_{2q}=\text{Clip3}(-t_{c2},t_{c2},(((q2_i+q0_i+1)>>1)-q1_i-\Delta_1)>>1).$$

In the foregoing, parameter $t_{c2}$ is defined in compliance with $t_{c2}=t_c>>1$.

It is noted that the foregoing filtering procedure, although described by way of example for horizontal filtering of vertical edges is equally applicable to vertical filtering of horizontal edges by respectively interchanging horizontal and vertical directions and rows with columns. Moreover, throughout the specification, a convention is applied, according to which the term "line" means either column or row.

The necessary steps for deciding about the application of a filter, and preferably for further selecting a type of filter to be applied for deblocking out of a plurality of filters having different strengths, result in a certain computational effort. As shown above, generally, for defining the filter strength, a decision is taken involving threshold values (cf. β and $t_c$ introduced above). The present invention particularly aims to improve the calculation scheme for the latter threshold parameter $t_c$ in order to reduce the necessary calculation effort, thereby improving processing efficiency by simplifying the calculation scheme.

Conventionally, calculation of parameter $t_c$ is based on a first parameter value (boundary strength (BS)) that indicates an estimation of how "blocky" a boundary (an edge) is, and a quantization parameter (QP) that indicates a size of the quantization steps employed in encoding. For $t_c$ determination, in an intermediate processing, an offset value (tc_offset), which no longer unambiguously reflects the "blockiness" of the boundary, is derived, to be combined with the QP to define the filter strength.

The present invention improves the conventional calculation scheme, in that it enables to derive parameter $t_c$ directly, based on a function of a predetermined combination (sum) of parameters BS and QP.

Figure 7:
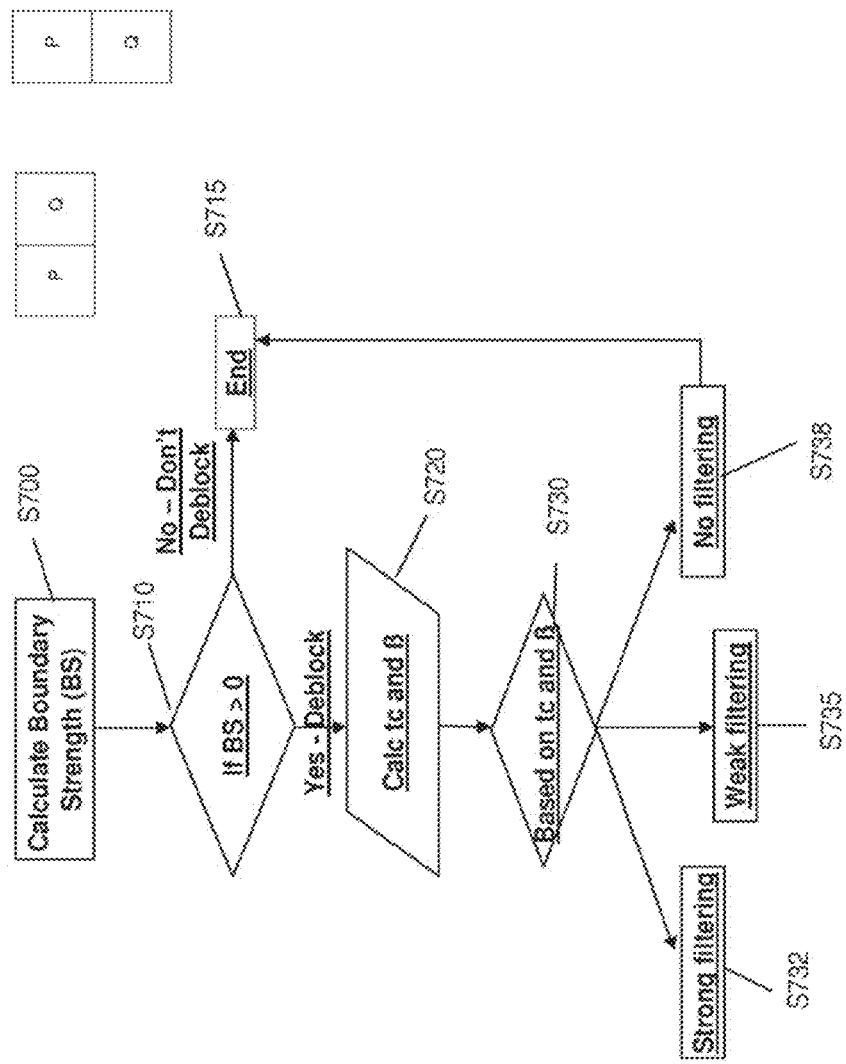
FIG. 7 is a flow chart illustrating a typical processing scheme of deblocking.

FIG. 7 shows a typical flow diagram of a process for deciding whether to apply deblocking at all and selecting an appropriate deblocking filter. The flowchart of FIG. 7 is generally applicable within the above discussed conventional schemes of deblocking, as well as within embodiments of the present invention.

The small boxes P and Q in the upper right hand corner of FIG. 7 represent a schematic illustration of two blocks P and Q of an image, which are adjacent and therefore share a common boundary. As illustrated, and as discussed above, the boundary between blocks P and Q can be vertical (left hand scheme) as well as horizontal (right hand scheme).

In initial step S700 of FIG. 7, the boundary strength (BS) is calculated as a first parameter for the decision. Generally, boundary strength BS is an integer parameter which may be zero or positive. Details of said boundary calculation strength of step S700 are discussed below with reference to FIG. 8 and subsequent figures.

After step S700, the processing flow proceeds to step S710. In step S710, it is decided whether a calculated boundary strength value BS is positive. If it is decided that BS is not positive (i.e. BS=0) in step S710, it is decided that no deblocking is performed for the currently processed edge, and processing of the flowchart ends at step S715.

If, to the contrary, the decision is step S710 is affirmative, it is decided to proceed with a further decision on deblocking. In step S720, parameters $t_c$ and p are calculated. Parameters $t_c$ and β calculated in step S720 are variables which are used in the following to manipulate the deblocking operation, in manner as described above with reference to FIGS. 5, 6A, and 6B. Both parameters $t_c$ and R depend on quantization parameter QP, as described above. As will be detailed below, $t_c$ further depends on boundary strength BS. Thus $t_c$ depends on both BS and QP.

In subsequent step S730, a decision is performed as to whether to select strong filtering (S732), weak filtering (S735) or that a more detailed investigation reveals that, contrary to the initial decision in step S710, no filtering is to be applied (S738). While in the first two cases the respective filtering processing is performed, in the latter case flow proceeds to step S715 and ends without filtering. The decision in step S730, including the revised no filtering decision of step S738, is based on the newly calculated parameters $t_c$ and β.

Figure 8:
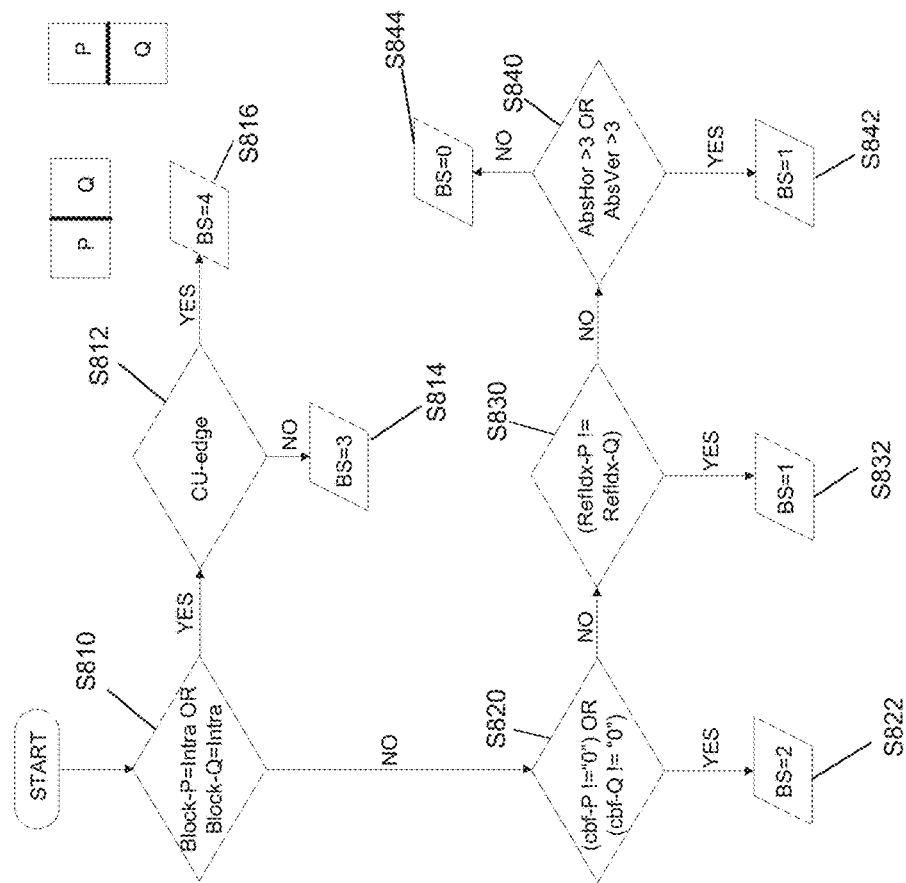
FIG. 8 is a flow diagram illustrating a conventional scheme of derivation of a deblocking boundary strength value.

FIG. 8 shows the details of the derivation of the deblocking boundary strength (BS) value of step S700. After start, in step S810, it is decided whether at least one of blocks P and Q belongs to an intra-coded image. The background of said decision resides in that for intra-coded pictures (I pictures) a larger quantization error in quantization is likely to occur.

If the decision is step S810 is affirmative, a conventional processing proceeds to step S812, where a decision is performed as to whether the block boundary currently processed is a boundary between coding units. A coding unit is generally a unit comprising one or more image blocks. More specifically, in a hybrid coder, each LCU (least coding unit of 64×64 samples) is further split into coding units (CU). The edge of the CU is defined as CU-edge. A CU can be further split into prediction units (PU's) and transform units (TU's). Each PU and TU block has an edge (PU-edge and TU-edge). Deblocking is performed for CU-, PU- and TU-edges. Hence a "block" in accordance with the present specification is a term that my have the meaning of a CU, but also of a PU and TU, if the CU is further subdivided. A boundary of a PU and TU can thus at the same time be a CU-edge or not.

If the decision in step S812 is affirmative (i.e., the currently processed block boundary is a CU-edge), boundary strength BS is set to the value of 4 (step S816). In the contrary case, if the decision in step S812 is negative, BS is set to 3 (S814).

In the case that the decision is step S810 is negative, processing proceeds to step S820. In step S820, it is determined whether none of the parameters cbf-P or cbf-Q has a value of zero It is noted that the combination of signs (!=) employed in the relational expressions in steps S820 and S830 means "not equal". In the decision, variable cbf-P determines if block P contains one or more transform coefficient levels that are not equal to zero. The respective indication for block Q is given by variable cbf-Q. More specifically, each of the parameters cbf-P and cbf-Q may assume values 0 and 1. A value equal to 1 specifies that the transform block of the respective block contains one or more transform coefficient levels not equal to zero. If the value is equal to 0, no non-zero transform coefficient levels are present in the respective transform block.

If the decision in step S820 is affirmative, BS is set to a value of 2 (S822).

In the contrary case, the processing proceeds to step S830. In step S830, a decision is performed as to whether the reference indexes of block P (RefIdx-P) and block Q (RefIdx-Q) differ from each other. The reference indexes (RefIdx-P and -Q) indicate a picture from which a respective block is referenced. In accordance therewith, a negative decision in step S830 means that both blocks P and Q are referenced from the same picture. An affirmative decision in step S830 means that both blocks P and Q are referenced from different pictures. In the case of an affirmative decision, BS is set to a value of 1 (S832).

In the case of a negative decision (S830: NO), the processing proceeds to step S840. In step S840, a decision is performed as to whether one of the parameters AbsHor of AbsVer are larger than 0. Herein, parameter AbsHor determines the absolute difference in the horizontal motion vector component value of the motion vector belonging to block P and block Q. AbsVer determines the absolute difference in the vertical motion vector component value of the motion vector belonging to block P and Q. It has to be noted that in the decision of step S840, the value of 3 is given by way of example only. Other values are equally possible within the scope of the present specification. If the decision in step S840 is affirmative, BS is set to 1 in step S842. In the contrary case, BS is set to zero in step S844.

As indicated before, the BS values imply how blocky an edge is. Generally, the greater the boundary strength, the more blocky is the edge. As can be seen from the scheme of FIG. 8, the latter property of the BS is reflected by the decisions of FIG. 8. For instance, in case of intra-coded blocks, in view of the larger quantization errors, generally higher values for BS are assigned.

The conventional scheme of FIG. 8 corresponds to HM deblocking filter of JCTVC-F803_d4 cited above, and the parameters employed therein and described in the foregoing have been introduced in the respective document "HM deblocking filter, JCTVC-F803_d4, "WD4: Working Draft 4 of High-Efficiency Video Coding", 6th meeting Torino, IT, Jul. 14-22, 2011" (cf. in particular sections 7.4.8 and 8.6.1.3).

Generally, deblocking for the edge is performed based on the derived value of BS. If BS is equal to zero, no deblocking is performed. In the contrary case, threshold parameter $t_c$ is derived, for further filtering decisions.

General conventional calculations schemes are known in the art.

For instance, in AVC, $t_c$ is derived based on a two-dimensional hard coded table indexed by the quantization parameter QP and the boundary strength BS value.

$$t_c = \text{cliptable } [QP][BS].$$

Said approach has the disadvantage of a large memory requirement to store a two-dimensional table.

A different conventional approach is known in HEVC (starting from HM version 1.0). In this case, $t_c$ is derived from a one-dimensional hardcoded table indexed by a variable tc_offset. More specifically, in a first step, based on the derived value of BS, a parameter tc_offset is calculated. Namely, if BS is lower than or equal to 2, it is set tc_offset=0, and in the contrary case, it set tc_offset=2. Parameter $t_c$ is determined according to the formula $$t_c = T\text{ctable}[QP + tc\_\text{offset}].$$

Function Tctable[ ] is defined as a tabular function with different $t_c$ values indexed using the function argument. In the present case, the function argument is the quantization parameter QP, with the added offset value tc_offset. The table is defined in the above cited document JCTVC-F803_d4 "HM deblocking filter, JCTVC-F803_d4, "WD4: Working Draft 4 of High-Efficiency Video Coding", 6th meeting Torino, IT, Jul. 14-22, 2011" (cf. in particular table 8-15).

It is a disadvantage of the latter conventional scheme that no differentiation is made between the values BS=1 and BS=2. As a consequence, more blocky edges having BS=2 and less blocky edges having BS=1 may undergo the same deblocking operation.

The present invention provides for simple and less complex way of deriving the parameter $TC_z$. Namely, if BS=2, tc_offset=1. If BS=1, tc_offset=0 is set.

As consequence the table size is reduced when compared to AVC. On the other hand, in comparison to HEVC (HM higher than 1.0) an additional differentiation between more blocky (BS=2) and less blocky (BS=1) edges is introduced. In other words as compared to the conventional HEVC approach, the present invention enables a more fine grained tc_offset derivation based on boundary strength BS.

Figure 9A:
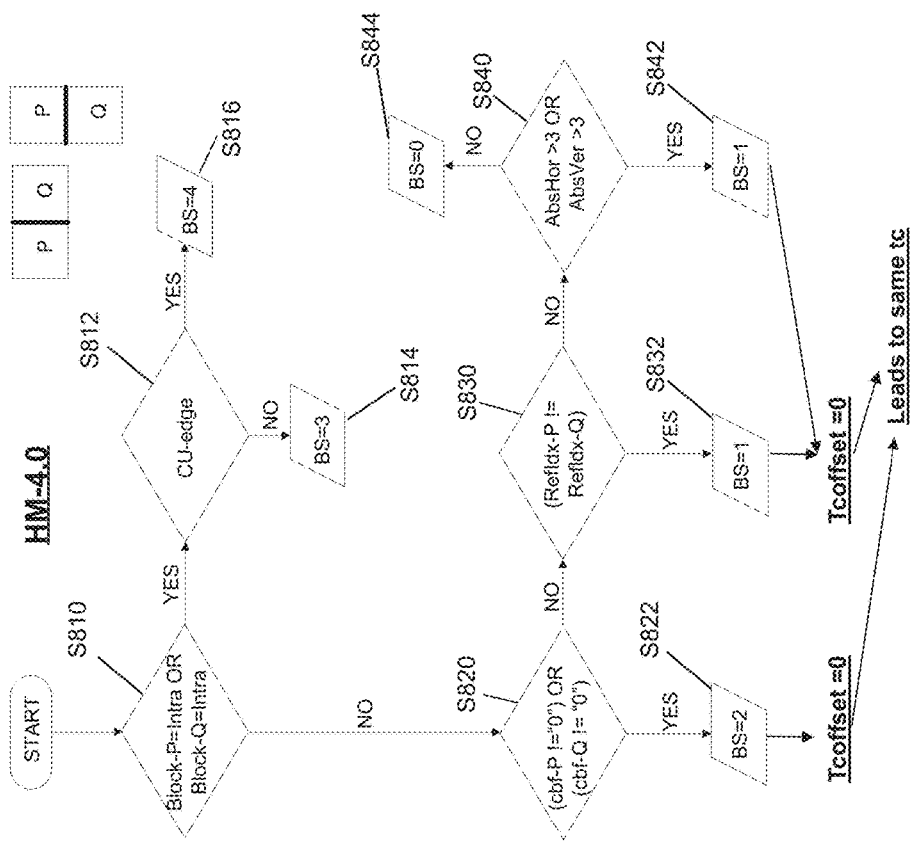
FIG. 9A is a flow diagram illustrating a conventional scheme for derivation of an offset parameter for determining a threshold parameter based on the boundary strength.
Figure 9B:
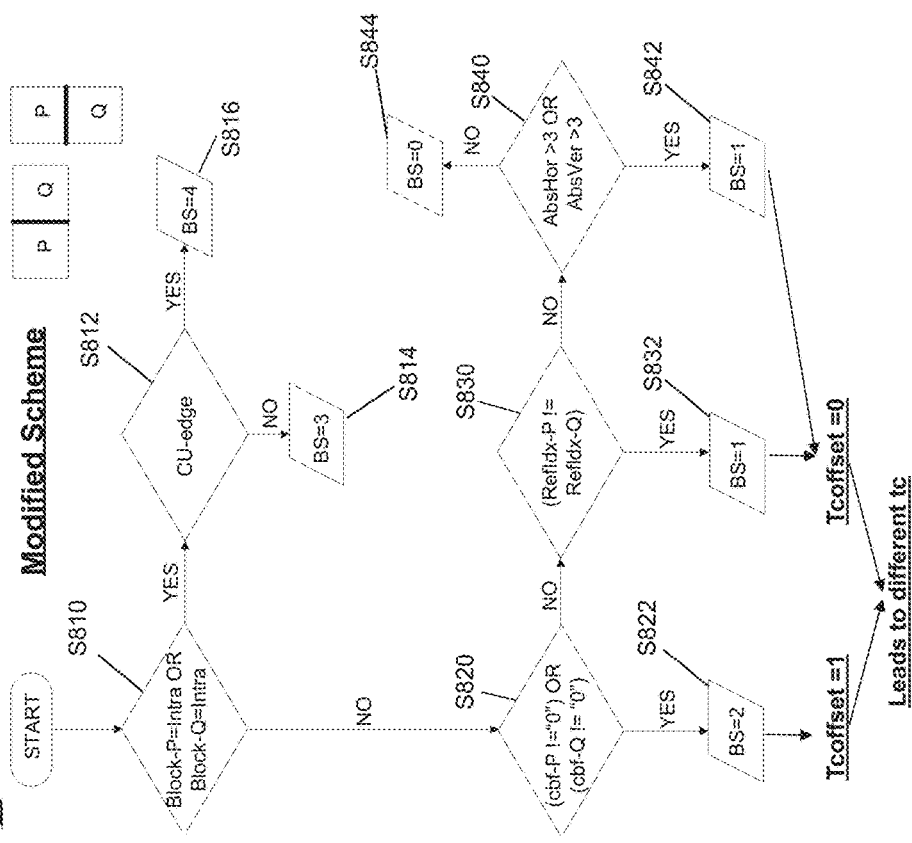
FIG. 9B is a flow diagram illustrating an improved derivation of an offset parameter for determining a threshold parameter based on the boundary strength, according to an aspect of the present invention.

Said difference is illustrated in FIGS. 9A and 9B.

FIG. 9A illustrates the conventional HM-4.0 approach of HEVC. As can be seen therefrom, both values BS=2 and BS=1 lead to the same $t_c$ value. To the contrary, FIG. 9B illustrates the modified scheme in accordance with an embodiment of the present invention. As can be seen therefrom, different $t_c$ values are obtained for the different values of BS=2 and BS=1.

The overall processing steps of deriving BS correspond to the scheme of FIG. 8, and the same processing steps are referenced with the same step numbers in FIGS. 8, 9A, and 9B.

Generally speaking, according to the embodiment of the present invention, parameter tc_offset is always set different when judgment in step S820 is affirmative as compared to the case when said judgment is negative.

FIGS. 10A and 10B illustrate a comparison of coding efficiency (as specified in the JCT-VC document JCTVC-F900, available under http://phenix.int-evry.fr/jct/doc_end_user/documents/6_Torino/wg11/JCTVC-F900-v1.zip) between the conventional scheme of FIG. 9A and the improved scheme of FIG. 9B. FIG. 10A corresponds to common test conditions. FIG. 10B corresponds to high conversation parameters (QP=39, 41, 43, and 45). BD—rate is computed using piece-wise cubic interpolation (cubic interpolation for shaded numbers). There is a slight coding efficiency gain observed in case of low delay P high efficiency and low delay P low complexity. The encoding times and decoding times are similar to the conventional scheme.

Figure 11A:
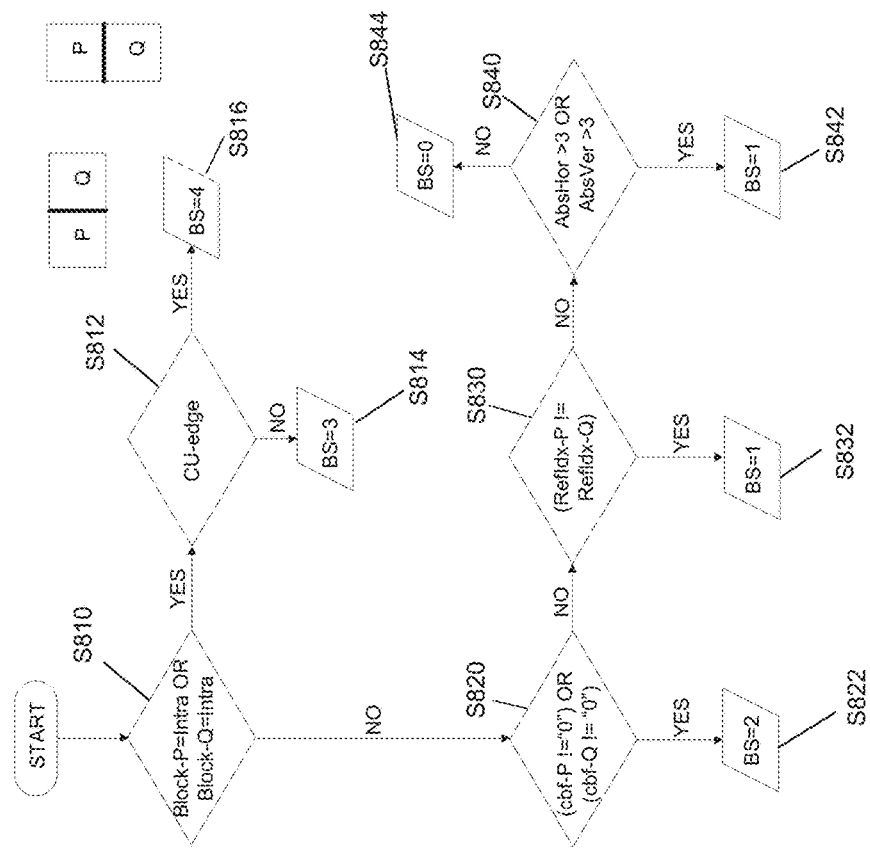
FIG. 11A is a flow diagram illustrating a conventional scheme of derivation of a deblocking boundary strength value, under the test conditions using high QPs.
Figure 11B:
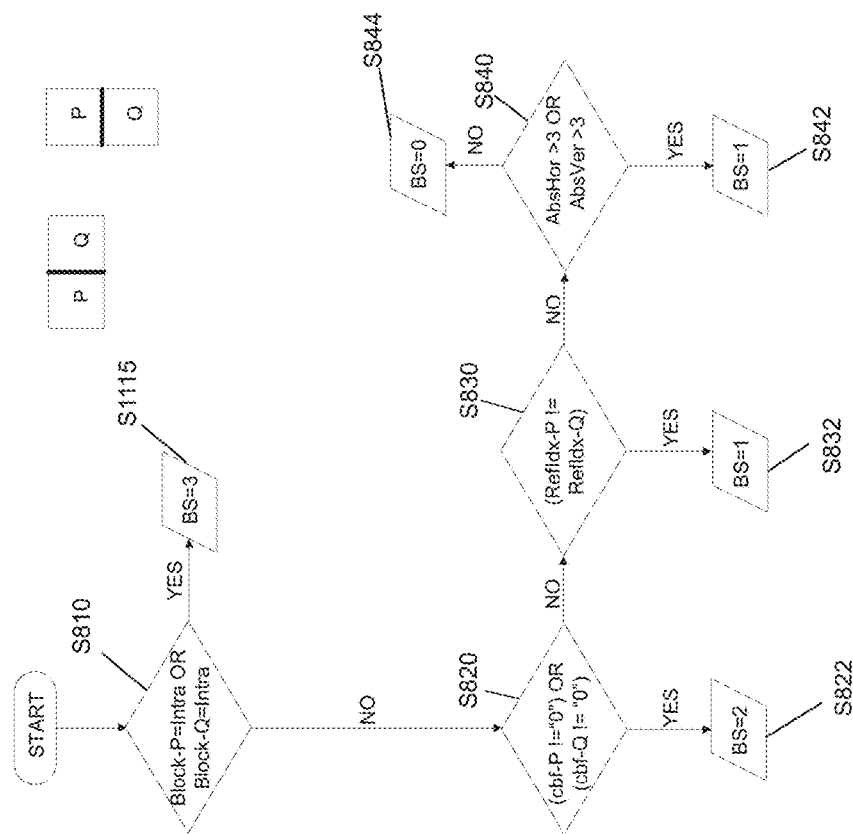
FIG. 11B is a flow diagram illustrating a simplified determination scheme for the boundary strength according to an embodiment of the present invention.

FIG. 11B illustrates a further simplification of the processing scheme of FIG. 8.

The simplification of FIG. 11B has been developed to reduce complexity of the decision tree and thus the calculation effort. In order to emphasise the differences between the conventional approach and the simplified approach in accordance with an embodiment of the present invention, the conventional approach of FIG. 8 has once more been illustrated in FIG. 11A, wherein equal reference numerals refer to equal steps. The improved method according to the embodiment of the present invention is illustrated in FIG. 11B. As can be seen therefrom, in case of affirmative decision in step S810, the value BS=3 is automatically assigned (step S1115 replacing step S812). The value 3 is however only an example, and another fixed value may be used within the present invention.

In other words, no distinction is made between CU edges and other block boundaries (in particular: TU edges and PU edges as described above). All edges adjacent to at least one intra-coded block are thus treated the same way and assigned the same BS. Therefore, the additional step of performing the check for CU edge is not necessary. Hence, computation effort can be reduced, since, as indicated above, each step in the BS derivation includes several CPU cycles.

FIG. 12 illustrates a comparison of coding efficiency (as specified in the JCT-VC document JCTVC-F900, available under http://phenix.int-evry.fr/jct/doc_end_user/documents/6_Torino/wg11/JCTVC-F900-v1.zip) between a scheme of FIG. 11 (right hand side) and the conventional scheme of FIG. 8.

As can be seen from FIG. 12, coding efficiencies generally match with the conventional approach. However, computational power is saved, since the derivation scheme is less complex due to the omission of the CU boundary check instruction in the critical part of the BS calculation.

Figure 13:
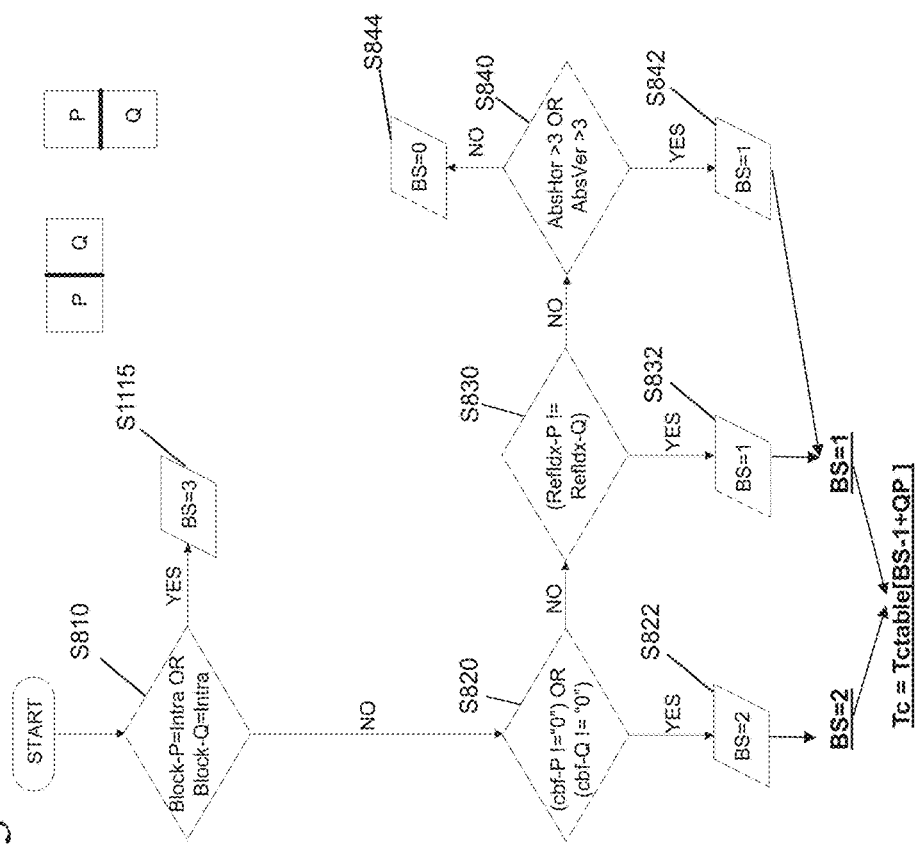
FIG. 13 is a flow diagram illustrating an improved and simplified BS calculation scheme in accordance with an embodiment of the present invention.

FIG. 13 illustrates a simplified decision scheme reflecting a combination of the innovative approaches of both FIGS. 9B and 11B. In FIG. 13, the same numerals correspond to the respective method steps as in the previous figures.

As can be seen from FIG. 13, an advantage is provided in view of the biunique (one-to-one and onto) correspondence between boundary strength BS and the additional offset parameter tc_offset. An intermediate determination of offset parameter tc_offset has become obsolete in view of the changed definitions according to the present invention, and can therefore be completely omitted, in order to save memory and calculation power requirements. As can be seen, $t_c$ depends directly on BS, and is derived in accordance with the formula $$t_c = T\text{ctable}[BS - 1 + QP]$$

In other words, $t_c$ has become a (unique) function of the sum of BS and QP.

More specifically, in accordance with the prior art, $t_c$ was defined in accordance with the formula $t_c$=Tctable[tc_offset+QP], wherein Tc_offset=2 when BS>2 and tc_offset=0 when BS<=2.

In accordance with the present invention the variable tc_offset is no more employed, and $t_c$ can be derived as $$t_c = Tc\text{table}[BS-1+QP] \quad \text{(FIG. 13)},$$

or even $$t_c = Tc\text{table}[BS+QP] \quad \text{(FIG. 14; see below)}.$$

Figure 14:
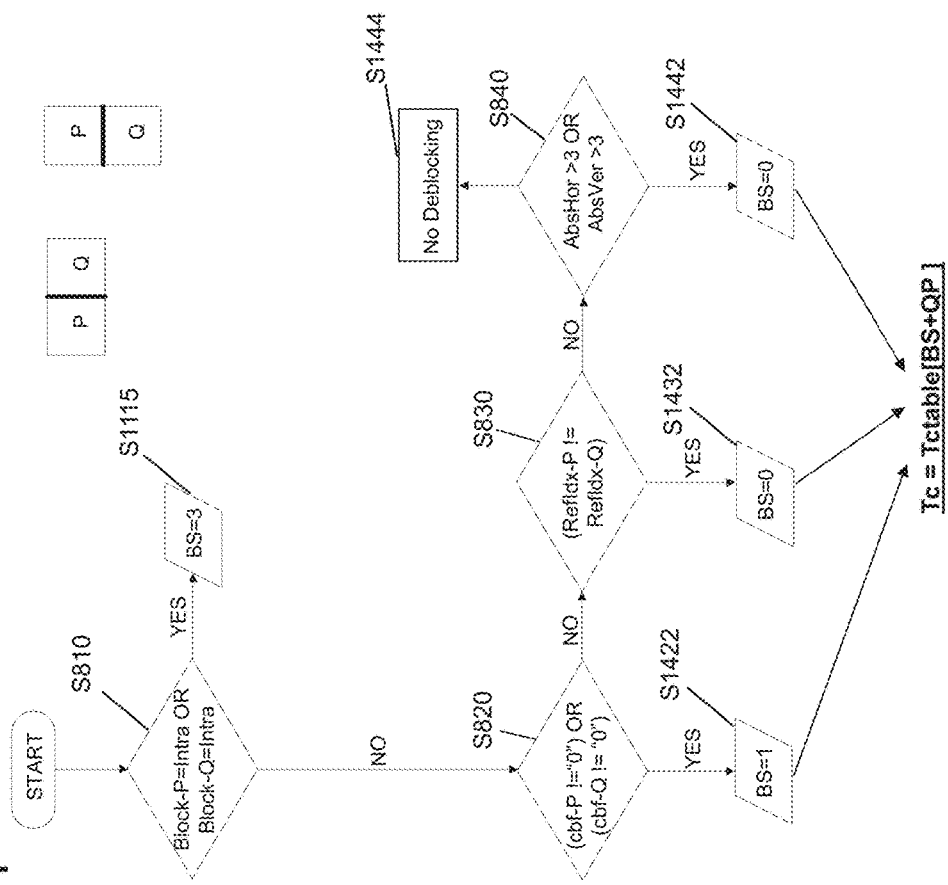
FIG. 14 is a flow diagram illustrating a further modified example of a calculation scheme in accordance with an embodiment of the present invention.

FIG. 14 illustrates a further modification as compared to FIG. 13. Namely, the BS value to be assigned in view of the decisions taken at the respective decision steps is downshifted by one.

More specifically, in the case of an affirmative decision in step S810, step S1115 is replaced by step S1415, wherein BS=2 is set. In the case of an affirmative decision in step S820, step S822 is replaced by step S1422, wherein BS=1 is set. In the case of an affirmative decision in step S830, step S832 is replaced with step S1432, wherein BS=0 is set. Similarly, in the case of an affirmative decision in step S840, step S842 is replaced with step S1442, wherein BS=0 is set.

As a consequence, calculation of parameter $t_c$ can be performed in accordance with the further simplified formula $$t_c = Tc\text{table}[BS+QP].$$

In accordance therewith, the sum of BS and QP is directly used as a look-up parameter in the look-up table function Tctable.

A specific situation has to be considered in the case of a negative decision in step S840. Since in FIG. 13 (and the previous respective figures), in this case value BS=0 was set in step S844, and no further downshift by one is available (since no negative values of the boundary strength are acceptable), the processing scheme is slightly modified in said specific case. Namely, step S844 is replaced in FIG. 14 with step S1444, wherein is decided to perform no deblocking, without setting any particular BS value. In other words, the "no deblocking" decision is performed without reference to the boundary strength value at all. Since in the case of no deblocking, any further decision involving parameter $t_c$ is not necessary, the intermediate step of assigning a boundary strength value is also unnecessary in that case.

Summarizing, the improved calculation schemes of FIGS. 13 and 14 enable the following advantages:
a) the need for employing intermediate parameter tc_offset is avoided, and therefore the derivation of the value $t_c$ which determines the strength of the filter has been simplified.
b) an additional differentiation has been introduced between more blocky edges having BS=2 (BS=1 in the case of FIG. 14) from less blocky edges having BS=1 (BS=0 in FIG. 14). As a consequence, a gain in coding efficiency and subjective quality, can be achieved.
c) the additional step of checking whether a processed boundary is a coding unit edge is omitted, and therefore the derivation of the boundary strength is simplified. The consequence is a reduction in complexity, which leads to a smaller number of instructions (CPU cycles) in BS derivation.

Figure 15:
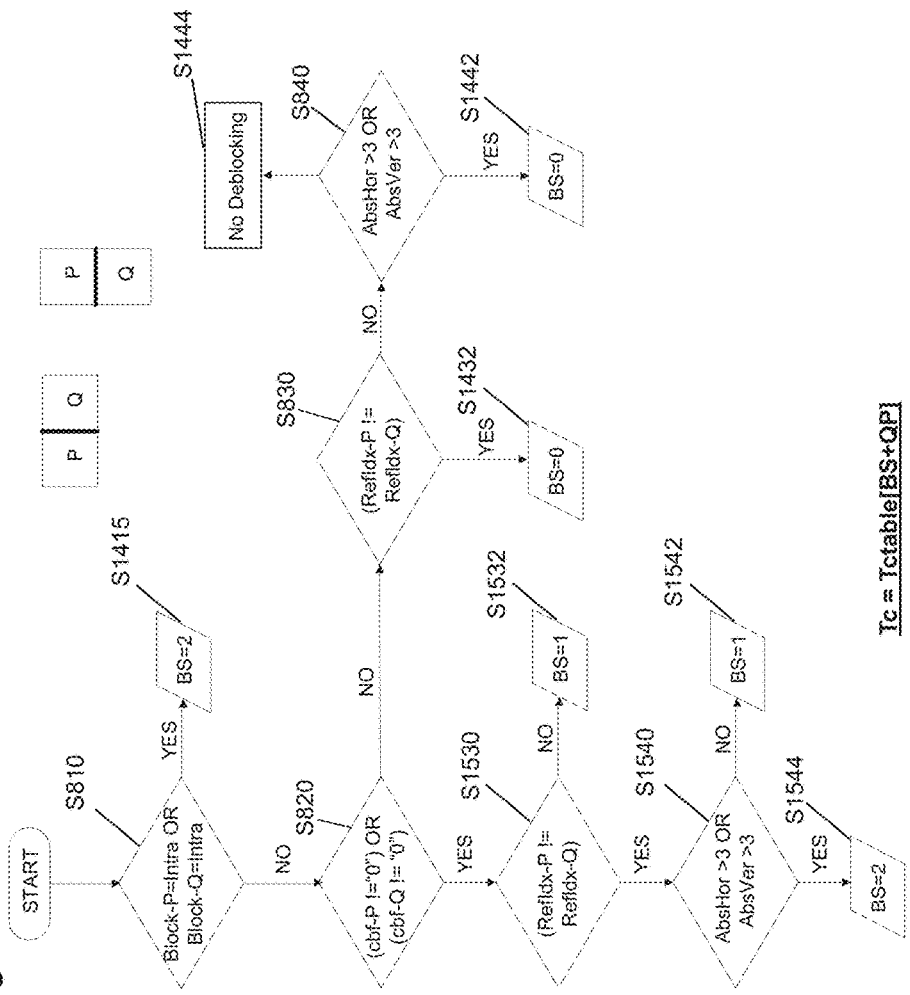
FIG. 15 is a flow diagram illustrating a further improved BS determination scheme in accordance with an embodiment of the present invention.

A further modification of the scheme of FIG. 14 is illustrated in FIG. 15. In FIG. 15, a further refinement of the decision tree is illustrated by performing the additional decisions with respect to reference indices and motion vector differences, not only in the case of a negative decision in step S820, but also in the case of an affirmative decision in said step. More specifically, while in FIG. 14 in the case of an affirmative decision in step S820, BS=1 is automatically assigned in step S1422, in accordance with the scheme of FIG. 15 the processing further proceeds to step S1530. In step S1530, a decision is performed as to whether reference indices of blocks P and Q are different or not. In the case of a negative decision, value BS=1 is set in step S1532. In case of an affirmative decision, the further decision is performed at step S1540, as to whether the absolute differences for example are vertical motion vector component values between blocks P and Q exceed a predetermined value (preferably 3). In case of a negative decision in step S1540, once more BS=1 is set, in step S1542. In case of an affirmative decision in step S1540, in contrast, step S1544 sets BS=2. In other words, the additional decision steps of FIG. 15 serve for emphasizing that a most blocky case occurs when there is at least one transform coefficient level not equal to zero, blocks P and Q are referenced by different pictures, and absolute differences in the motion vector components are present (i.e. all three decisions S820, S1530 and S1540 are decided affirmative). In said case, a different boundary strength (preferably: higher boundary strength) is assigned as compared to the situation in FIG. 14. More specifically, if all three aforementioned decisions are judged affirmative, in the present example the same value BS=2 is assigned as in case of intra-coded blocks. However, it is noted that the present invention is not limited to said values, and other values for emphasizing particularly blocky cases are equally possible.

Figure 16:
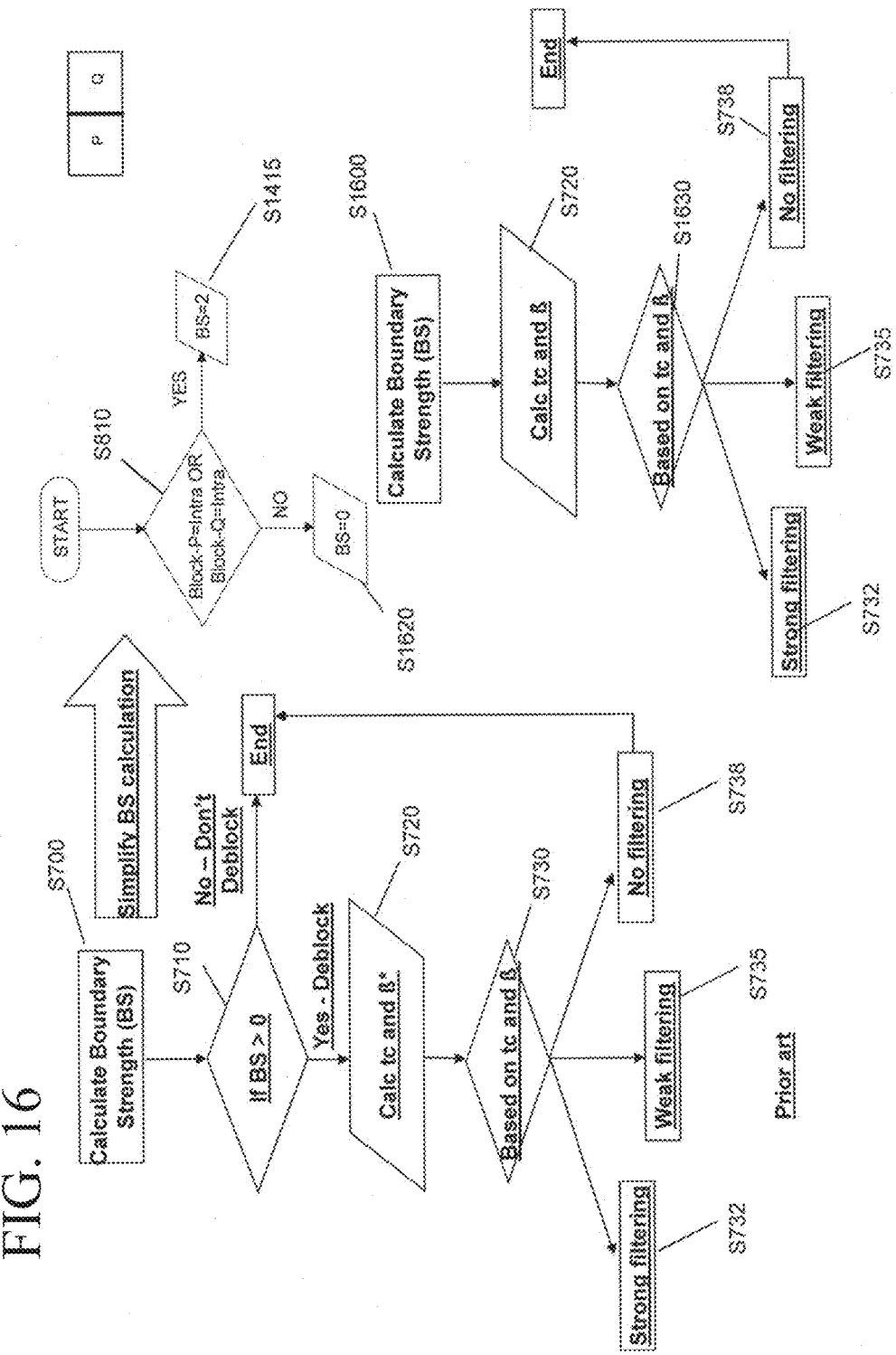
FIG. 16 is a flow chart illustrating simplification in the overall deblocking filtering decision tree in accordance with an aspect of the present invention.

In addition, a simplification of the overall decision scheme of FIG. 7 is shown in FIG. 16. The scheme on the left hand side of FIG. 16 corresponds to the conventional scheme of FIG. 7. The further simplification enables to additionally simplify the calculation. The overall scheme is shown on the lower right hand side of FIG. 16. In the first step of S1600, the boundary strength is calculated in accordance with a further simplified scheme. Said further simplified scheme is illustrated in the upper right hand side portion of FIG. 16. Namely, only a single decision is carried out in the further simplified BS calculation scheme of FIG. 16. If the single decision in step S810 is affirmative (at least one intra-coded block), BS=2 is set in step S1450. In contrast to the previous schemes, also in the negative decision case of step S810 no further decisions are performed. To the contrary, processing proceeds to step S1620, wherein BS is set to the fixed value BS=0. Based on the modified calculation in step S1600 (detailed in the right upper portion of the figure) processing immediately proceeds to step S720, wherein parameters $t_c$ and β are calculated. Based on $t_c$ and β, in subsequent step S1630, it is decided whether to perform strong filtering (S732), weak filtering (S735) or no filtering (S738). It is noted that the values 2 and zero to be assigned to parameter BS in steps S1415 and S1620 are exemplary values only, and other fixed values are within the scope of the present invention.

As a consequence, no filtering is only decided at a pixel based stage of the blocking decisions. Calculation of $t_c$ is further simplified in that a value of 2 (or another fixed value) is added or not added to the argument of the table function Tctable.

Thus, the calculation is further simplified in that different fixed values are assigned to the boundary strength BS, in result of only a single decision to be performed in step S810.

A further advantage of the present invention concerns a reduction of the amount of bits required to store the values of boundary strength BS. As described above with reference to FIG. 8, in the prior art the boundary strength BS takes values in the inclusive range [0, 4]. As a consequence, a minimum of three bits are required to represent the BS values for each edge. On the other hand, the method in the current invention, only uses BS values in the inclusive range [0,3]. Thus, the present invention takes said specific situation into account, and enables to use only two bits to represent the BS value. Namely, the present invention, avoided the differentiation between coding unit boundaries and other kinds of block boundaries that are not coding unit edges, results in having only boundary strength values from 0 to 3. An embodiment (cf. FIG. 14 and subsequent figures) even produces the BS range to be the inclusive interval [0,2].

Thus, the present invention provides the further advantage of achieving the same deblocking result as the current HM-4.0 while involving less memory requirements.

In the following, some further particular aspects and features of embodiments of the present invention are briefly described.

According to an embodiment, the first parameter is set to a second fixed value, different from the first fixed value if the first judgment is negative.

Further, according to an embodiment, the method according to the invention comprises the step of deciding not at all to apply deblocking to said boundary, based on another threshold defined using the second parameter, if the filter having the lower strength of said first and said second deblocking filters has been selected in said selection step. The apparatus according to the embodiment comprises a deciding unit for performing the decision step.

Also, according to an embodiment, if the first judgment is negative, the determining step further comprising the steps of second judging whether at least one of said adjacent pixel blocks includes at least one non-zero level of transform coefficients, third judging whether a reference index indicating a picture, from which an image block is referenced, is different for both of said adjacent image blocks, and fourth judging whether the absolute difference in at least one of the horizontal and vertical motion vector component values between the two adjacent image blocks exceeds a predetermined threshold value. If the second, third and fourth judging steps are all judged affirmative, the value of the first parameter is determined to be said first fixed value. Otherwise, the first parameter is determined to be a different value. An apparatus according to the embodiment further comprises a second, a third and a fourth judging section to be operated if the judgment by the first judging section is negative, for performing the second, third and fourth judgment steps.

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Embodiment A

Figure 17:
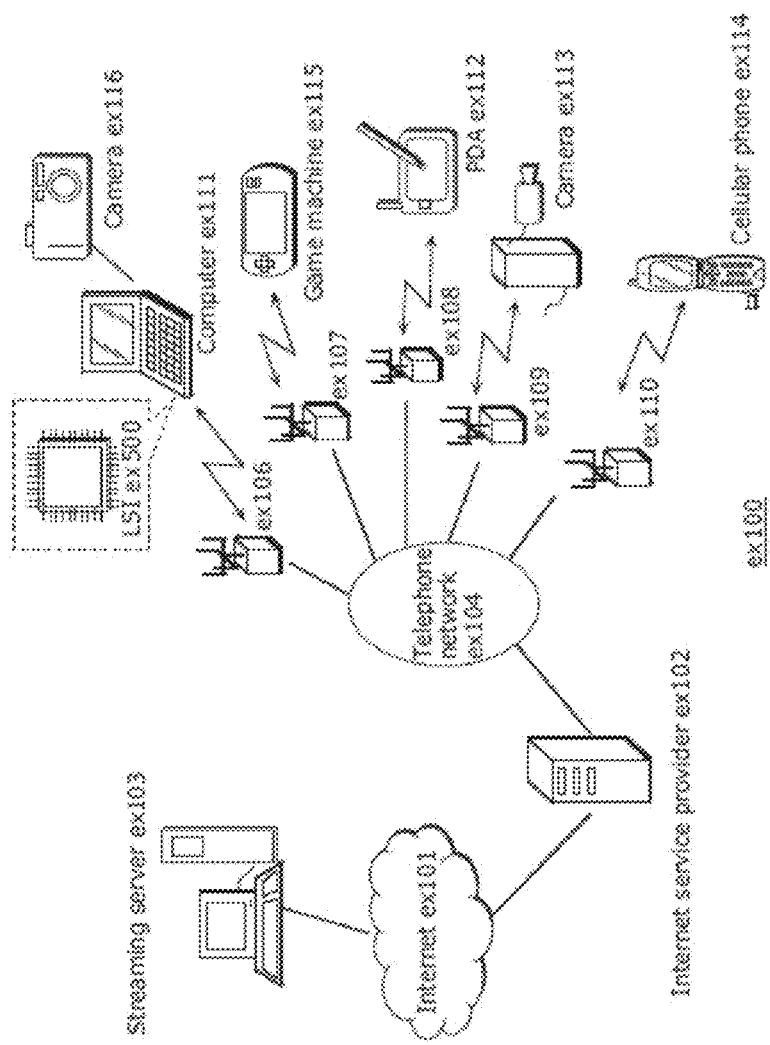
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
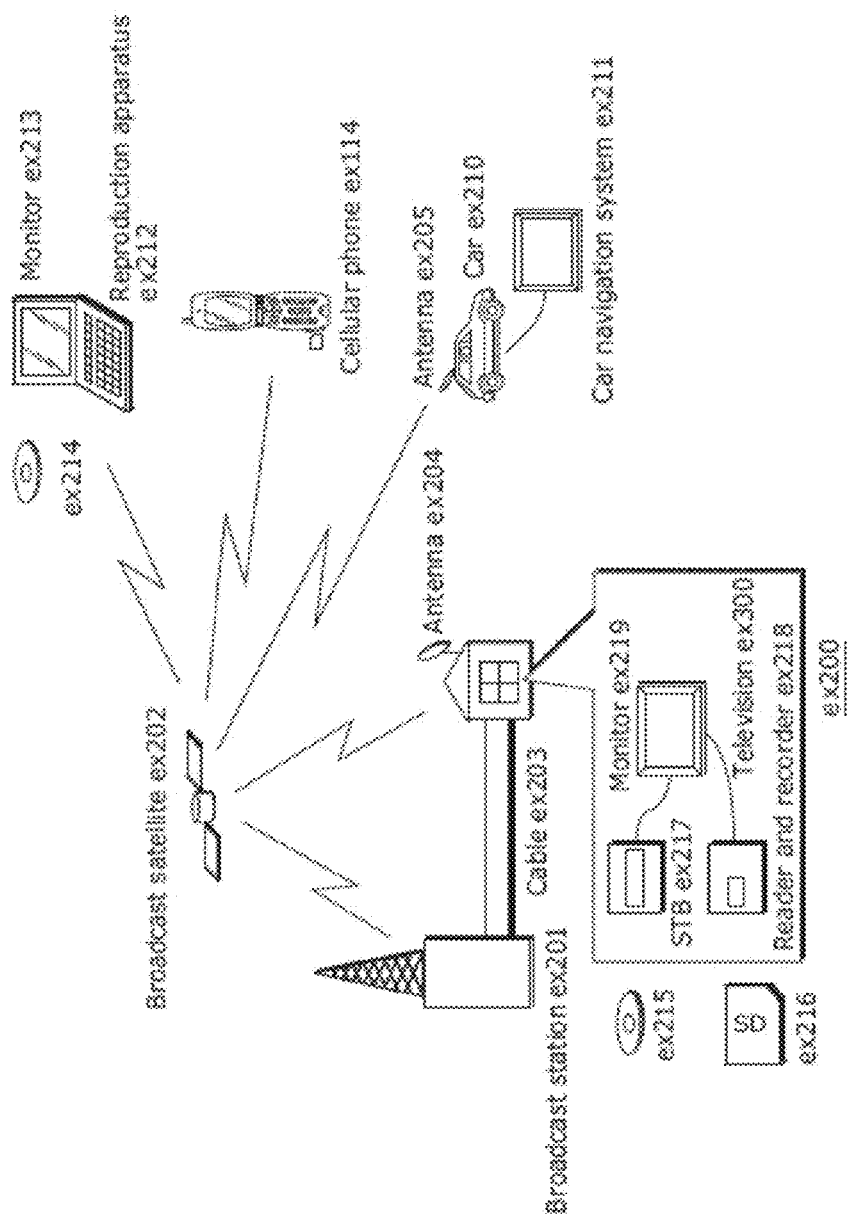
FIG. 18 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
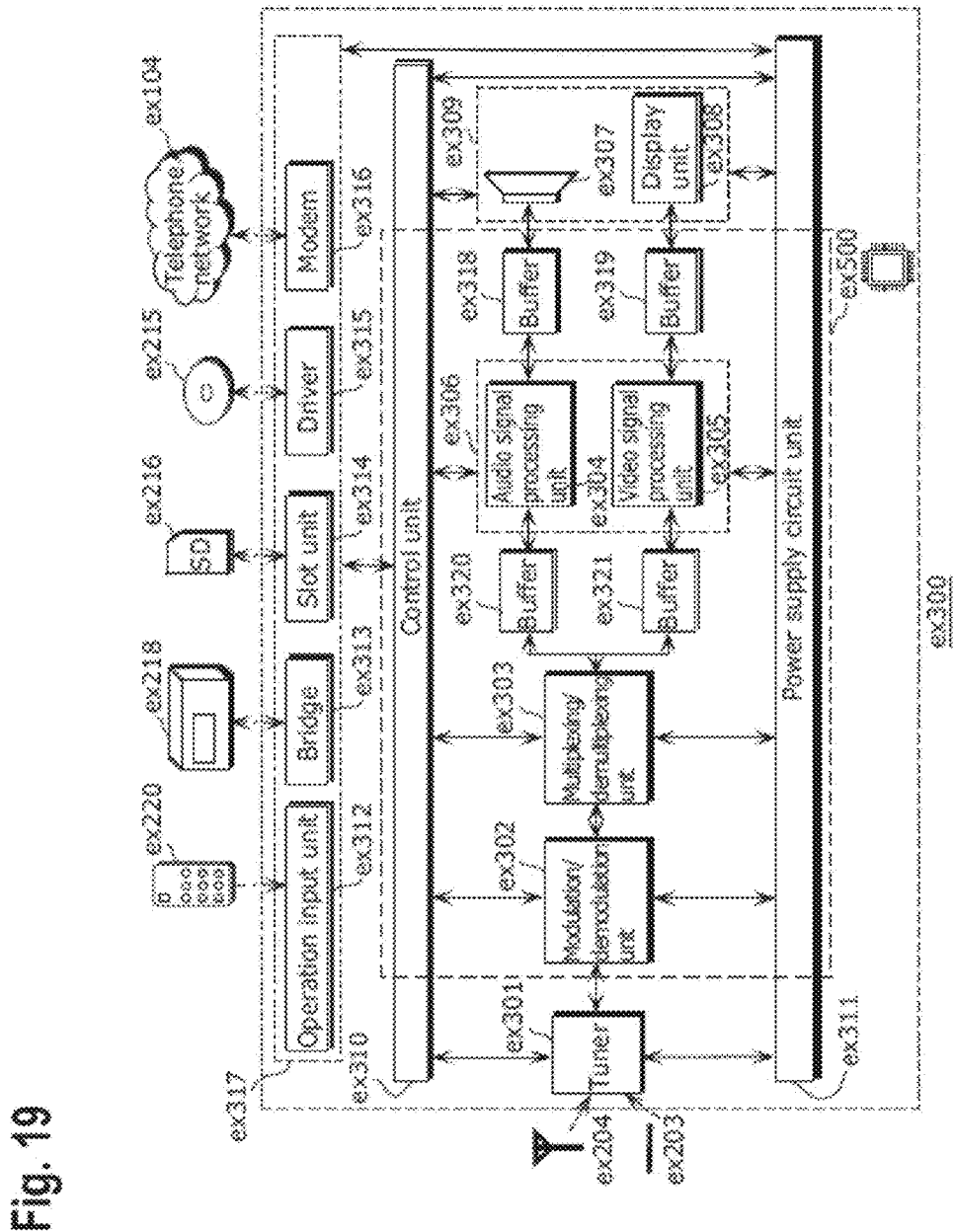
FIG. 19 shows a block diagram illustrating an example of a configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
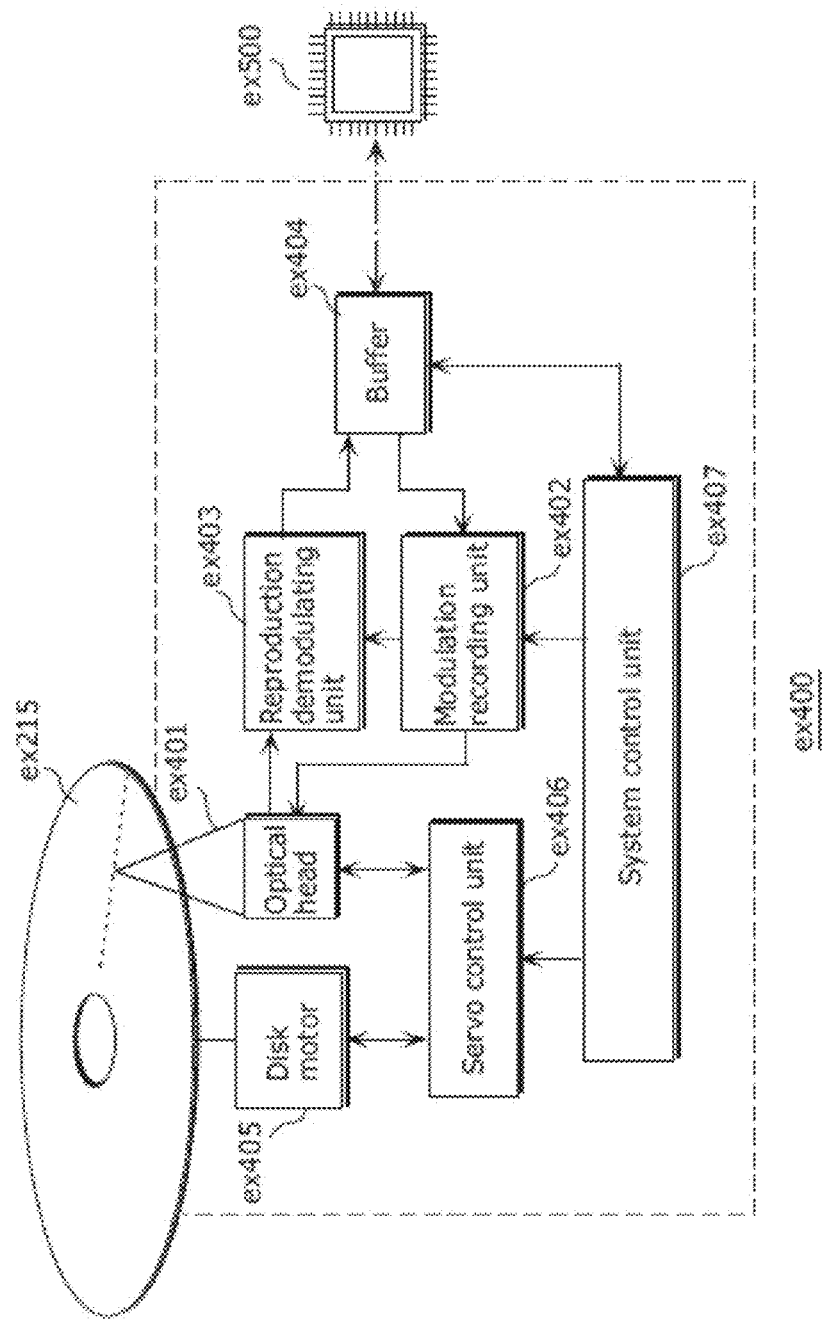
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
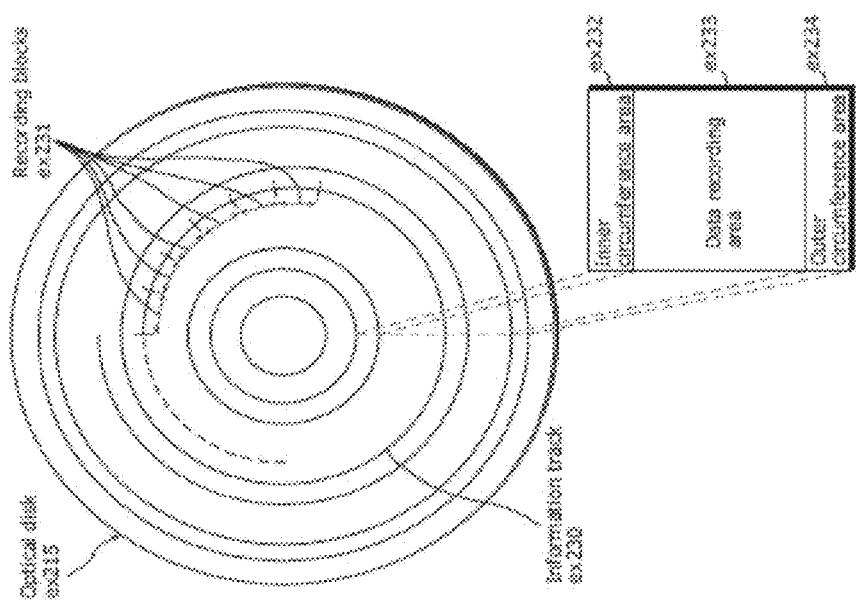
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
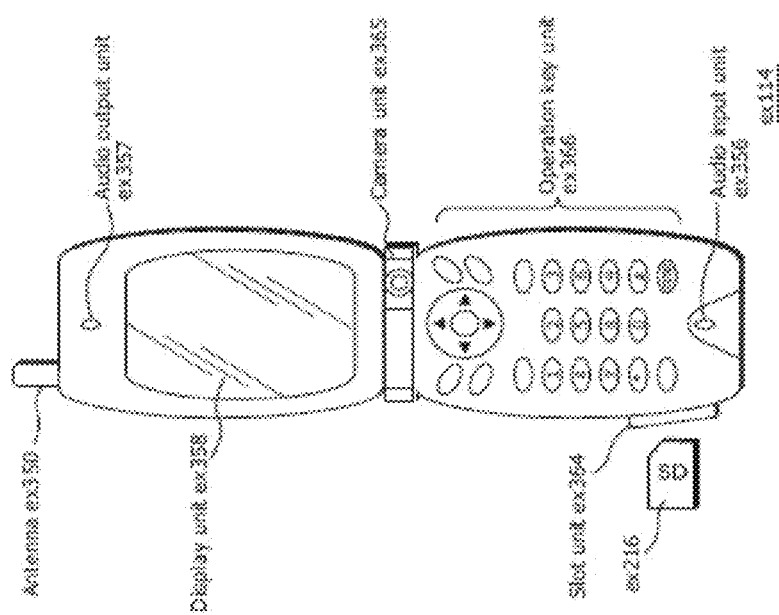
FIG. 22A shows an example of a cellular phone.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
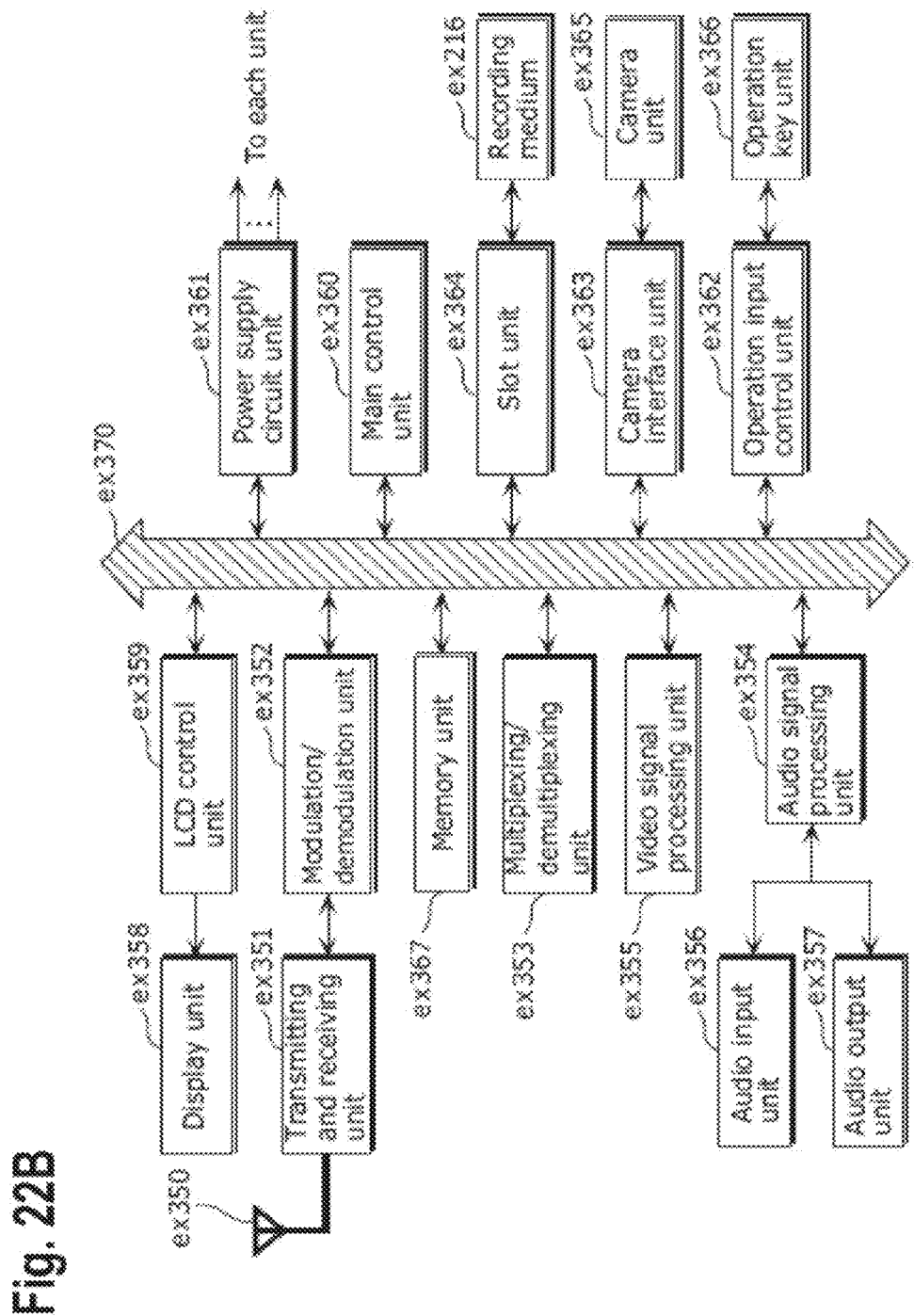
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359.

Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment B

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 23:
FIG. 23 illustrates a structure of multiplexed data.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
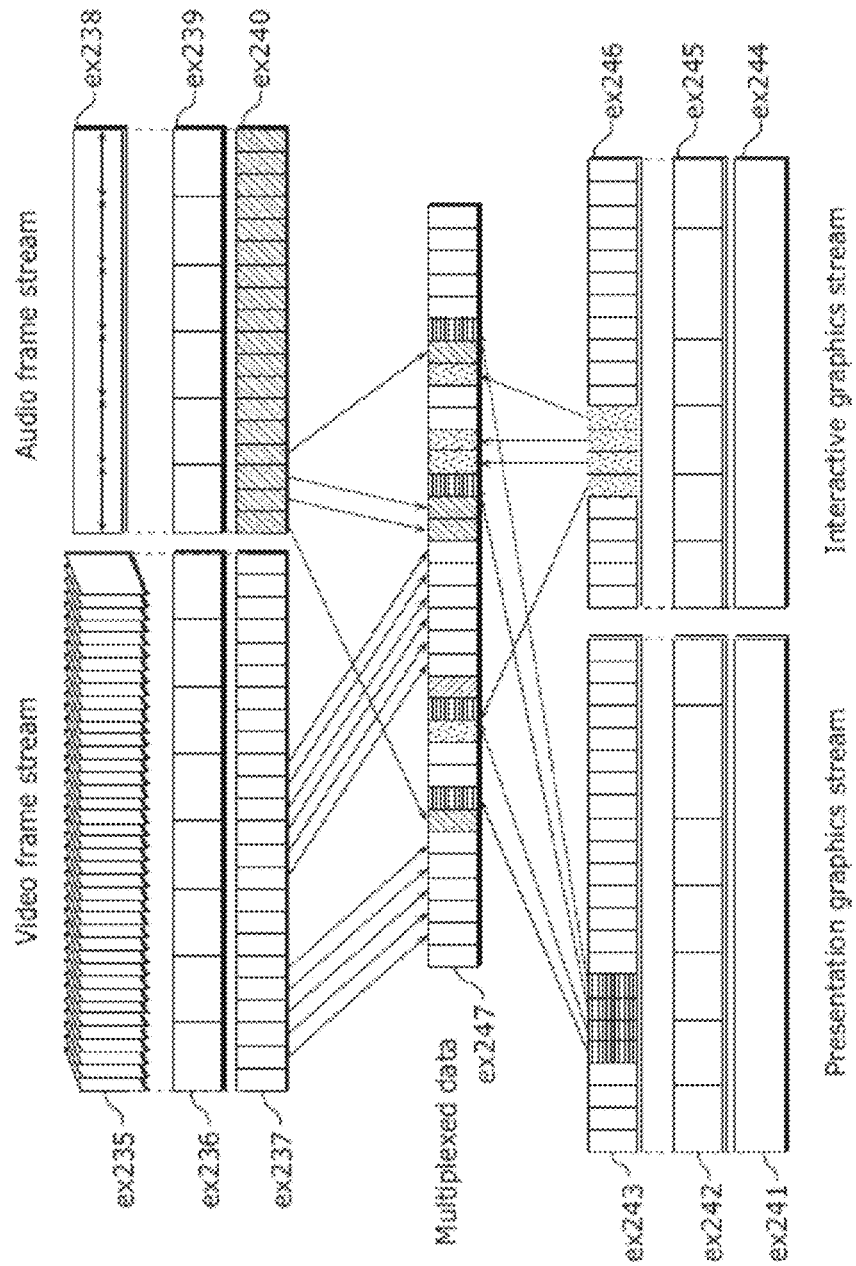
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
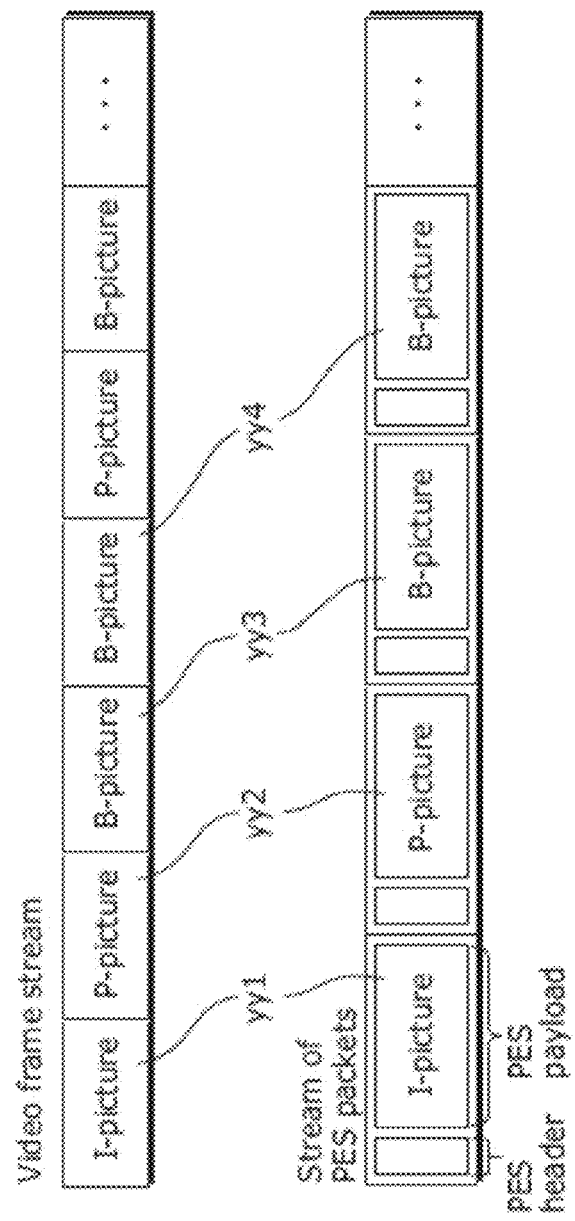
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 26:
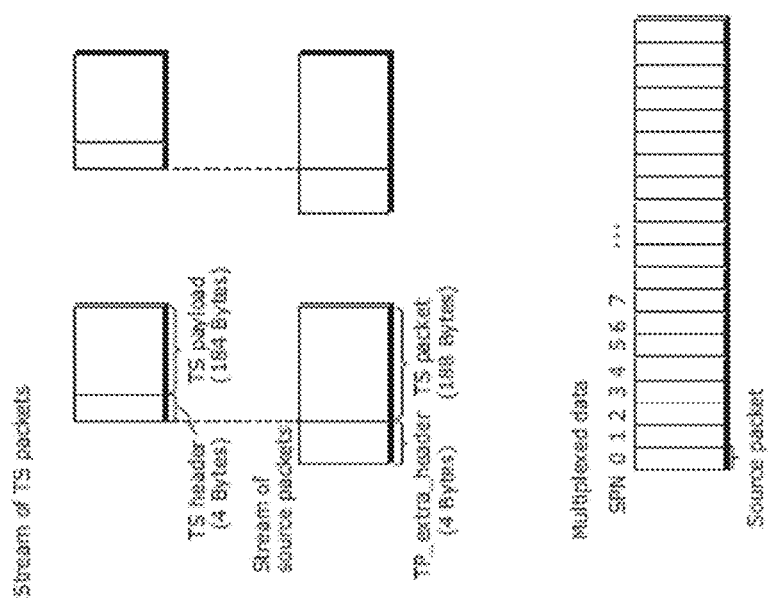
FIG. 26 shows a structure of TS packets and source packets in the multiplexed data.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
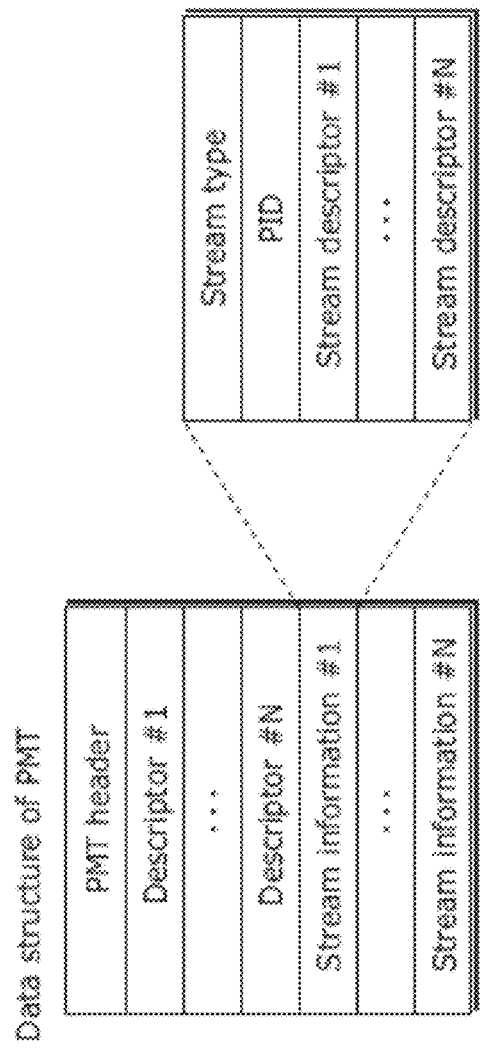
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
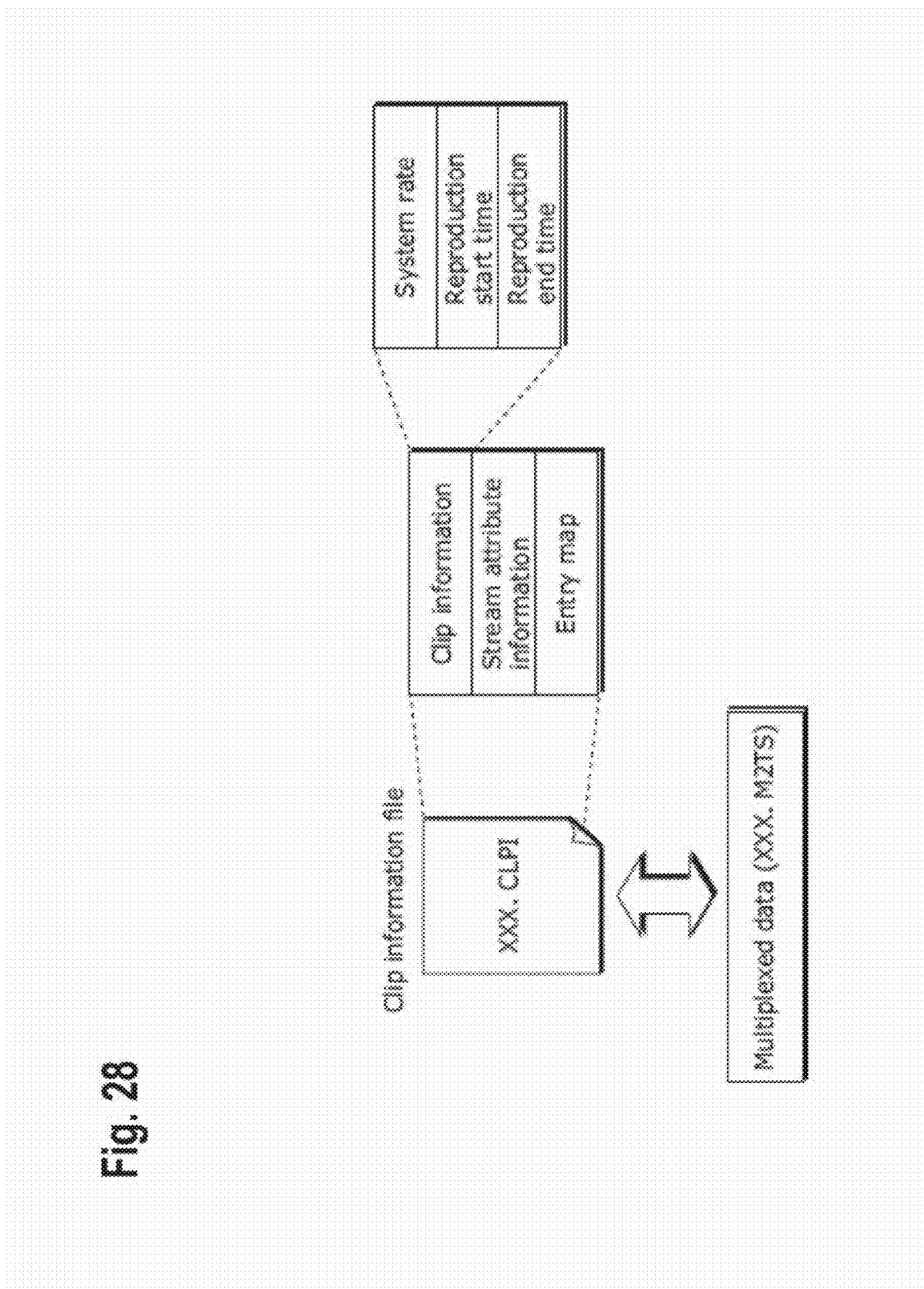
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
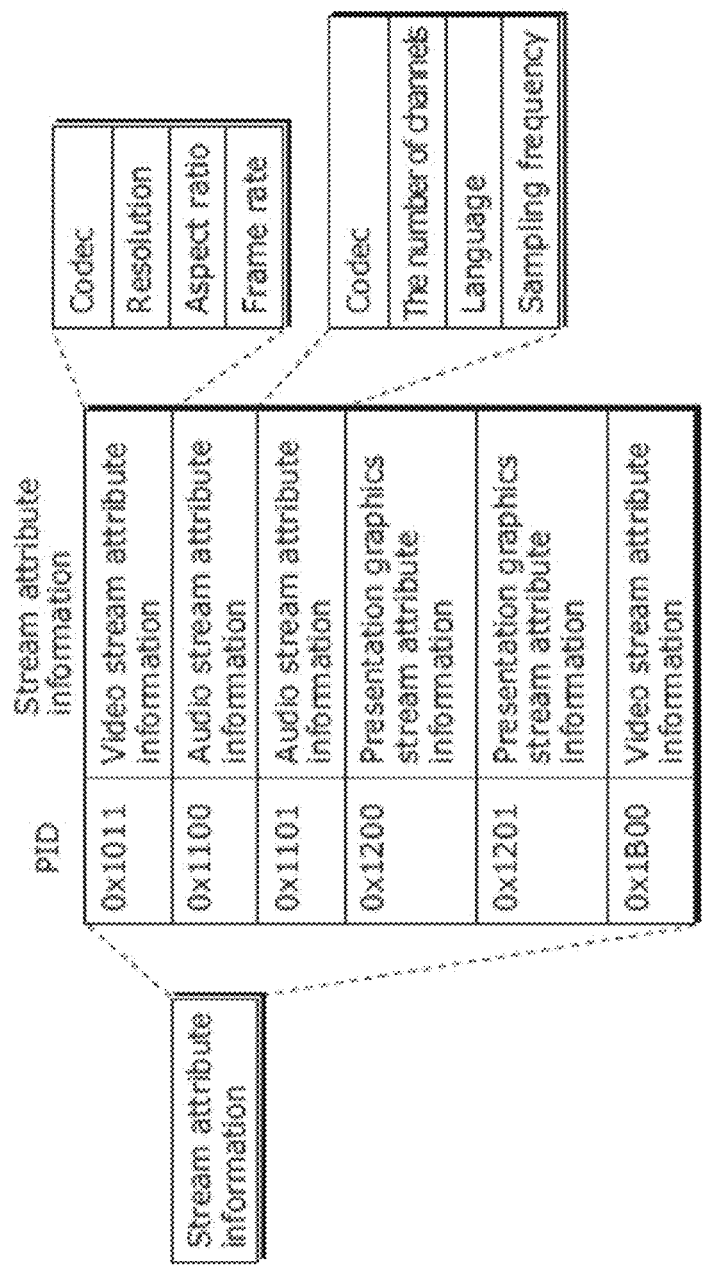
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
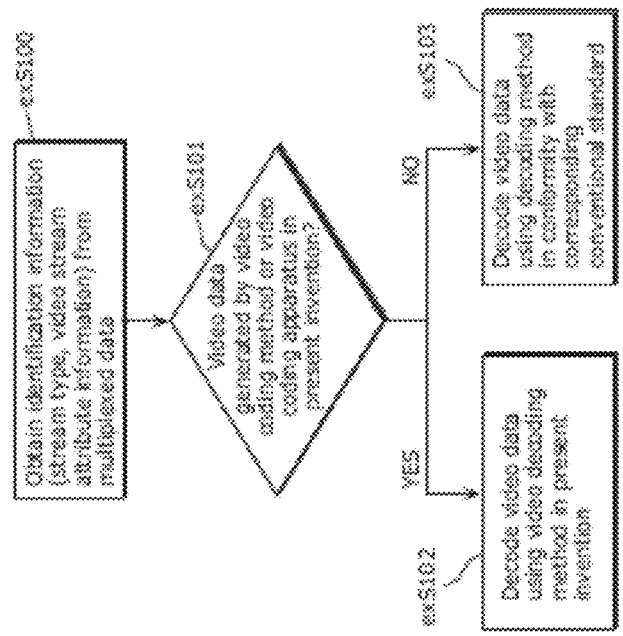
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment C

Figure 31:
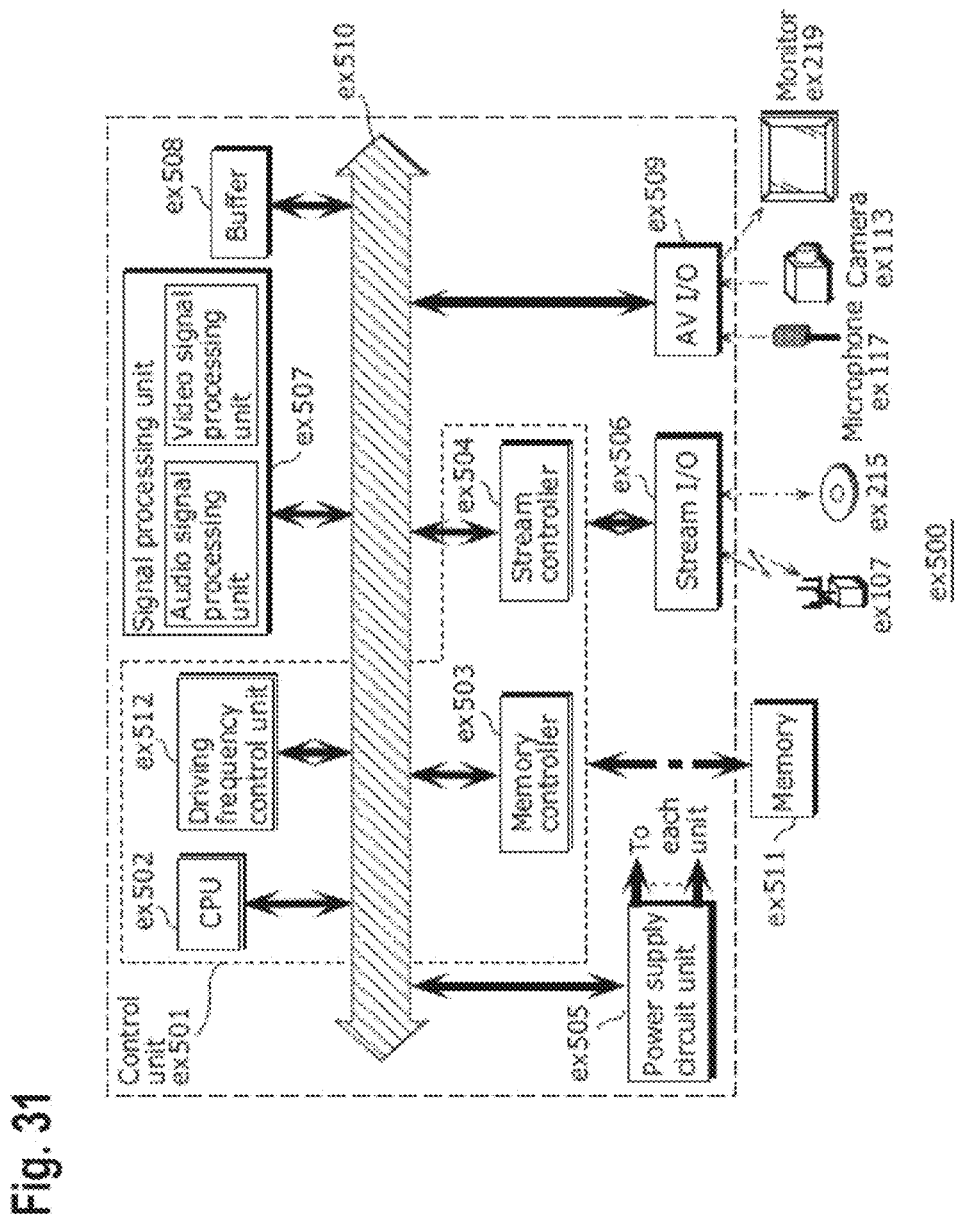
FIG. 31 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment D

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
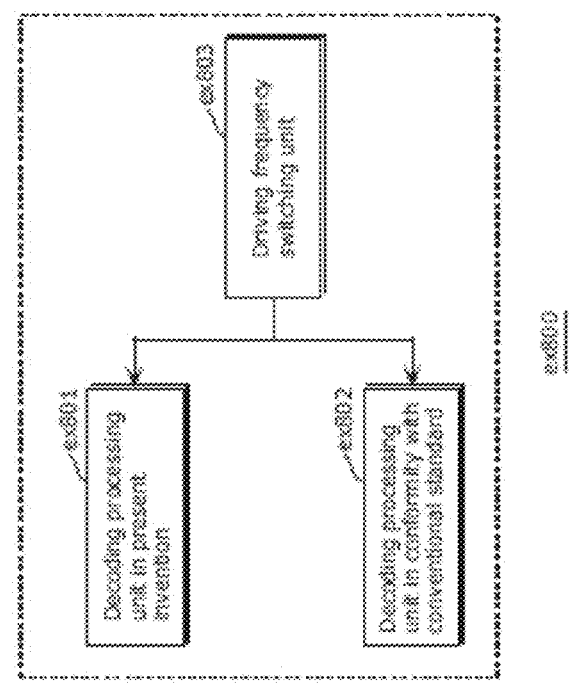
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
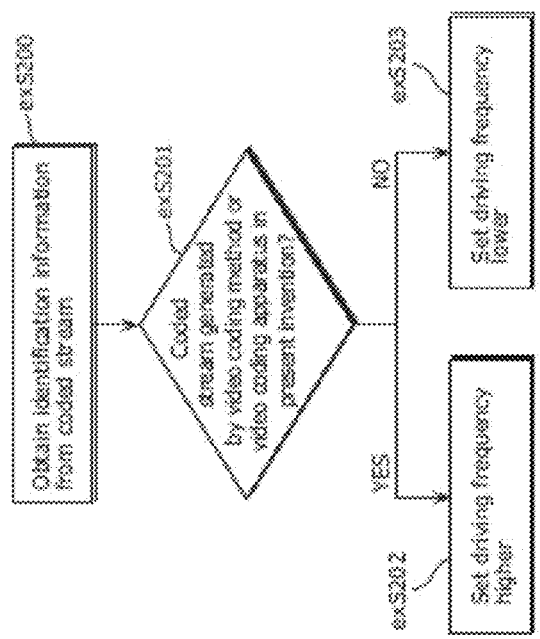
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment E

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 35B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

In summary, the present invention relates to an advantageous scheme for boundary strength derivation and decision processing related to deblocking filtering. More particularly, the present invention improves schemes for deciding deblocking and selecting appropriate deblocking filters known in the art so as to reduce the number of calculation cycles and required memory space.

The invention claimed is:

1. A method for decoding a coded current block of an image including a plurality of pixels, the method comprising:
    reconstructing the coded current block; and
    performing deblocking filtering on image blocks, the image blocks including the reconstructed current block,
    wherein the deblocking filtering including:
        determining a first parameter indicating a strength of a block boundary between two adjacent image blocks, the first parameter being within a range from 0 to 2;
        calculating a second parameter based on the first parameter and a quantization parameter, the second parameter being calculated as a function of the sum of the first parameter and the quantization parameter; and
        selecting a first deblocking filter or a second deblocking filter to be applied to the block boundary using a threshold defined based on the second parameter, the first deblocking filter and the second deblocking filter having different filter strengths, and
    wherein the first parameter is determined to have a value of 1 when an absolute difference between the horizontal or vertical component of the motion vector belonging to the first image block of the two adjacent image blocks and the horizontal or vertical component of the motion vector belonging to the second image block of the two adjacent image blocks is greater than a non-zero threshold.

2. An apparatus for decoding a coded current block of an image including a plurality of pixels, the apparatus comprising:
    a decoding unit for reconstructing the coded current block, and performing deblocking filtering on image blocks, the image blocks including the reconstructed current block,
    wherein the decoding includes:
        a determining unit for determining a first parameter indicating a strength of a block boundary between two adjacent image blocks, the first parameter being within a range from 0 to 2;
        a calculation unit for calculating a second parameter based on the first parameter and a quantization parameter, the second parameter being calculated as a function of the sum of the first parameter and the quantization parameter; and a selection unit for selecting a first deblocking filter or a second deblocking filter to be applied to the block boundary using a threshold defined based on the second parameter, the first deblocking filter and the second deblocking filter having different filter strengths, and wherein the first parameter is determined to have a value of 1 when an absolute difference between the horizontal or vertical component of the motion vector belonging to the first image block of the two adjacent image blocks and the horizontal or vertical component of the motion vector belonging to the second image block of the two adjacent image blocks is greater than a non-zero threshold.

3. A non-transitory computer readable medium having a computer-readable program code embodied thereon, the program code being adapted to carry out a method for decoding a coded current block of an image including a plurality of pixels, the method comprising:

reconstructing the coded current block; and performing deblocking filtering on image blocks, the image blocks including the reconstructed current block, wherein the deblocking filtering including:

determining a first parameter indicating a strength of a block boundary between two adjacent image blocks, the first parameter being within a range from 0 to 2;

calculating a second parameter based on the first parameter and a quantization parameter, the second parameter being calculated as a function of the sum of the first parameter and the quantization parameter; and selecting a first deblocking filter or a second deblocking filter to be applied to the block boundary using a threshold defined based on the second parameter, the first deblocking filter and the second deblocking filter having different filter strengths, and wherein the first parameter is determined to have a value of 1 when an absolute difference between the horizontal or vertical component of the motion vector belonging to the first image block of the two adjacent image blocks and the horizontal or vertical component of the motion vector belonging to the second image block of the two adjacent image blocks is greater than a non-zero threshold.

* * * * *